US012663267B2

(12) United States Patent (10) Patent No.: US 12,663,267 B2
Kitajima et al. (45) Date of Patent: Jun. 23, 2026

(54) BIAS ESTIMATION DEVICE, FORKLIFT, BIAS ESTIMATION METHOD, AND PROGRAM

(71) Applicant: Mitsubishi Logisnext Co., Ltd., Nagaokakyo (JP)

(72) Inventors: Katsumasa Kitajima, Tokyo (JP); Yusuke Kinouchi, Tokyo (JP); Masahiro Yamada, Tokyo (JP); Takumi Fujita, Tokyo (JP); Takuya Akashi, Nagaokakyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 455 days.

(21) Appl. No.: 18/135,479

(22) Filed: Apr. 17, 2023

(65) Prior Publication Data

US 2024/0044650 A1    Feb. 8, 2024

(30) Foreign Application Priority Data

Aug. 5, 2022    (JP) ................................ 2022-125288

(51) Int. Cl.
*G01C 21/16* (2006.01)
*B66F 9/075* (2006.01)
*B66F 9/24* (2006.01)

(52) U.S. Cl.
CPC .......... *G01C 21/183* (2020.08); *B66F 9/0755* (2013.01); *B66F 9/24* (2013.01); *G01C 21/166* (2020.08)

(58) Field of Classification Search
CPC .. G01C 21/183; G01C 21/166; G01C 21/188; G01C 25/005; B66F 9/0755; B66F 9/24
See application file for complete search history.

(56) References Cited

U.S. PATENT DOCUMENTS

| | | |
|---|---|---|
| 2010/0007550 A1 | 1/2010 | Nagamiya et al. |
| 2013/0085646 A1* | 4/2013 | Nishiwaki ................. B66F 9/24 |
| | | 701/50 |

(Continued)

FOREIGN PATENT DOCUMENTS

| | | |
|---|---|---|
| DE | 100 05 958 A1 | 3/2001 |
| GB | 2553349 A | 3/2018 |

(Continued)

*Primary Examiner* — Anne Marie Antonucci

(74) *Attorney, Agent, or Firm* — Birch, Stewart, Kolasch & Birch, LLP

(57) ABSTRACT
A bias estimation device includes a determination unit configured to determine whether a forklift is stationary based on a measurement value from a first sensor configured to detect information regarding movement of the forklift and a measurement value from a second sensor configured to detect information regarding a cargo handling device included in the forklift, an accumulation unit configured to accumulate an IMU measurement value that is a measurement value from an inertial measurement unit included in the forklift when the determination unit determines that the forklift is stationary and stop accumulation of the IMU measurement value when the determination unit determines that the forklift is not stationary, and a calculation unit configured to calculate a bias of the IMU measurement value based on the IMU measurement value accumulated in the accumulation unit.

13 Claims, 14 Drawing Sheets

(56) References Cited

U.S. PATENT DOCUMENTS

| | | | |
|---|---|---|---|
| 2021/0009392 A1 | 1/2021 | Kamiya et al. | |
| 2022/0358674 A1 | 11/2022 | Okada | |
| 2023/0349722 A1* | 11/2023 | Hanson | G01C 21/16 |
| 2024/0012090 A1* | 1/2024 | Cherukuri | G01S 5/0264 |

FOREIGN PATENT DOCUMENTS

| | | | |
|---|---|---|---|
| JP | 4-286600 A | 10/1992 | |
| JP | 6-265367 A | 9/1994 | |
| JP | 2010-19703 A | 1/2010 | |
| JP | 2015-778 A | 1/2015 | |
| JP | 2019-167213 A | 10/2019 | |
| WO | WO 2021/157116 A1 | 8/2021 | |

* cited by examiner

BIAS ESTIMATION DEVICE, FORKLIFT, BIAS ESTIMATION METHOD, AND PROGRAM

CROSS-REFERENCE TO RELATED APPLICATIONS

This application claims the benefit of priority to Japanese Patent Application Number 2022-125288 filed on Aug. 5, 2022. The entire contents of the above-identified application are hereby incorporated by reference.

TECHNICAL FIELD

The disclosure relates to a bias estimation device, a forklift, a bias estimation method, and a program.

RELATED ART

In position determination of a mobile body such as a forklift, measurement results of a global positioning system (GPS) and an inertial measurement unit (IMU) are used, and the position determination results are combined to achieve high position determination accuracy (for example, JP 2010-019703 A). However, since the IMU measurement value (acceleration, speed, angular velocity, and the like) includes a bias, the position determination result may become rather deteriorated unless the bias is compensated. As an example of deteriorating the position determination result, even during stopping, the measurement value of the yaw angular velocity may not become 0 due to a bias, causing the position determination result indicating that the vehicle body is rotating.

In response to this problem, WO 2021/157116 A proposes a method of using the fact that a bias element included in a measurement value can be easily separated when a mobile body is in a stationary state to estimate a bias by using a measurement value immediately after activation of the IMU in which there is a high possibility that the mobile body is stationary and a method of estimating a bias by using a measurement value of the IMU when it is determined from a camera image that the vehicle is stationary. However, in an environment for actually operating the mobile body, there is a possibility that the user operates the mobile body immediately after activation of the IMU, and thus, it is insufficient to determine that the mobile body is in a stationary state only on the condition of being immediately after activation of the IMU. Also in the stationary determination using a camera, when the camera captures a relatively distant object, a change in an image (for example, movement amount of a feature point) becomes small with respect to the motion of a vehicle body, and thus, the IMU measurement value may be affected by the vibration of the vehicle body or the like due to the operation of the worker or the lifting and lowering of a fork.

JP 2010-019703 A proposes a method of estimating a bias to reduce an error of a position determination result by comparing a position determination result using the IMU with a past position determination result from the GPS or comparing with a position determination result (value obtained by integrating a position determination result from GPS and a position determination result from IMU using a Kalman filter) of a system until the position determination result from the GPS is updated. During movement of a mobile body, change in the IMU measurement value due to the movement is dominant, and the influence of a bias is relatively reduced. Therefore, separating the bias from the IMU measurement value is difficult, and there is a high possibility that the estimation accuracy is not sufficient as compared with the bias estimation in the stationary state. However, the technique disclosed in JP 2010-019703 A estimates the bias regardless of whether the mobile body is stopped or moving.

SUMMARY

There is a need for a technique for accurately estimating a bias of an IMU measurement value regarding position determination of a forklift.

The disclosure provides a bias estimation device, a forklift, a bias estimation method, and a program that can solve the above problems.

A bias estimation device of the disclosure includes a determination unit configured to determine whether a forklift is stationary based on a measurement value from a first sensor configured to detect information regarding movement of the forklift and a measurement value from a second sensor configured to detect information regarding a cargo handling device included in the forklift, an accumulation unit configured to accumulate an IMU measurement value that is a measurement value from an inertial measurement unit included in the forklift when the determination unit determines that the forklift is stationary and stop accumulation of the IMU measurement value when the determination unit determines that the forklift is not stationary, and a calculation unit configured to calculate a bias of the IMU measurement value based on the IMU measurement value accumulated in the accumulation unit.

A forklift of the disclosure includes a traveling body, a cargo handling device, the bias estimation device described above, and a positioning device configured to compensate the IMU measurement value by using the bias estimation device and determine a position of the forklift based on the IMU measurement value after compensation.

A bias estimation method of the disclosure includes a step of repeatedly determining whether a forklift is stationary based on a measurement value from a first sensor configured to detect information regarding movement of the forklift and a measurement value from a second sensor configured to detect information regarding a cargo handling device included in the forklift, a step of accumulating an IMU measurement value that is a measurement value from an inertial measurement unit included in the forklift when the forklift is determined to be stationary in the step of determining, a step of stopping accumulation of the IMU measurement value when the forklift is determined to be not stationary in the step of determining, and a step of calculating a bias of the IMU measurement value based on the IMU measurement value accumulated.

A program of the disclosure causes a computer to execute a step of repeatedly determining whether a forklift is stationary based on a measurement value from a first sensor configured to detect information regarding movement of the forklift and a measurement value from a second sensor configured to detect information regarding a cargo handling device included in the forklift, a step of accumulating an IMU measurement value that is a measurement value from an inertial measurement unit included in the forklift when the forklift is determined to be stationary in the step of determining, a step of stopping accumulation of the IMU measurement value when the forklift is determined to be not stationary in the step of determining, and a step of calculating a bias of the IMU measurement value based on the IMU measurement value accumulated.

According to the bias estimation device, the positioning device, the forklift, the bias estimation method, and the program described above, the bias of an IMU measurement value can be accurately estimated in consideration of an operation environment of the forklift regarding positioning of the forklift.

BRIEF DESCRIPTION OF DRAWINGS

The disclosure will be described with reference to the accompanying drawings, wherein like numbers reference like elements.

DESCRIPTION OF EMBODIMENTS

First Embodiment

Figure 1:
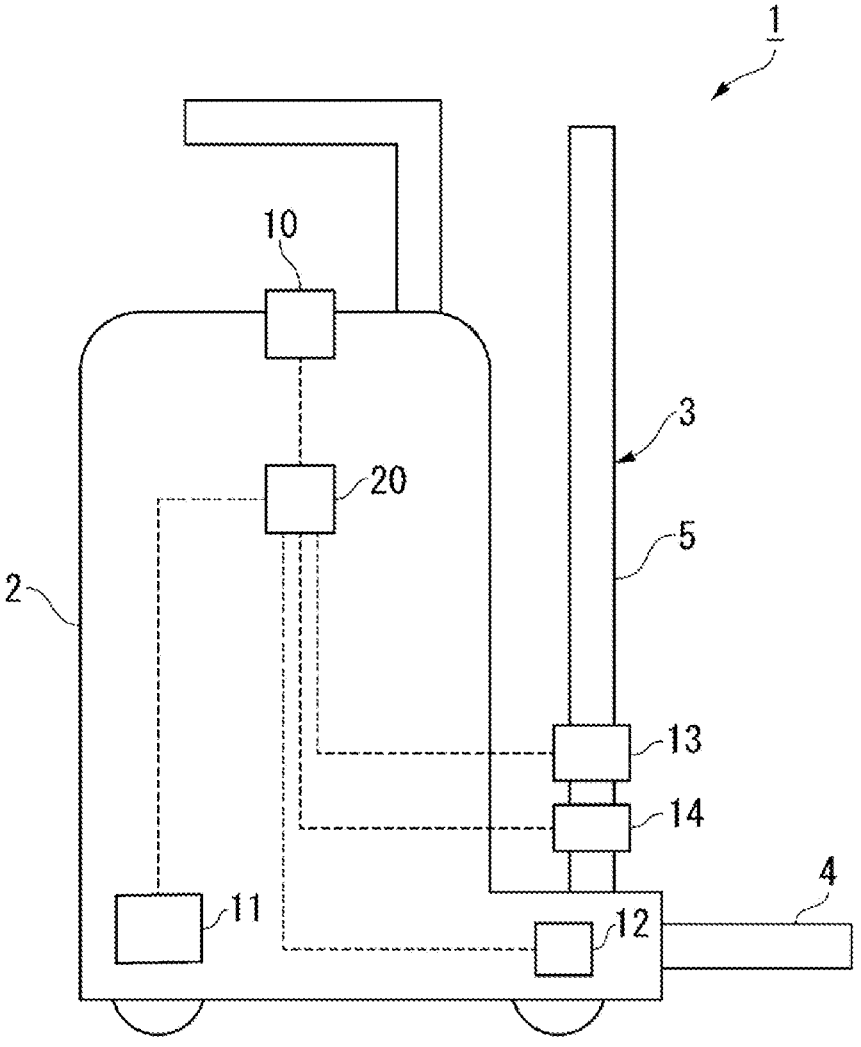
FIG. 1 is a schematic diagram illustrating an example of a forklift according to a first embodiment.

A bias estimation method of the disclosure will be described below with reference to the drawings.
Body Configuration of Forklift FIG. 1 is a schematic diagram illustrating an example of a forklift according to the first embodiment.

A manned forklift 1 includes a traveling body 2, a cargo handling device 3, and a computation device 20. The traveling body 2 includes a tire, a driving device not illustrated, and a steering device, and causes the forklift 1 to travel. The cargo handling device 3 includes a fork 4 and a lifting and lowering device 5 that lifts and lowers the fork 4, and performs a cargo handling operation by lifting and lowering a cargo loaded on the fork 4. The traveling body 2 is provided with an IMU 10, a first encoder 11, and a second encoder 12. The IMU 10 includes an accelerometer and a gyro sensor, and can detect a moving speed, acceleration, a moving direction, and a turning direction of the forklift 1. The first encoder 11 is a rotary encoder that detects a rotation speed of a tire (for example, rear wheel) of the forklift 1. The second encoder 12, which can detect the movement of the forklift 1 by the measurement value of the first encoder 11, is a rotary encoder that detects a steering angle of a tire (for example, front wheel) of the forklift 1. The steering operation of the worker with respect to the forklift 1 can be detected by the measurement value of the second encoder 12. The cargo handling device 3 is provided with a lifting height sensor 13 and a load sensor 14. The lifting height sensor 13 detects a lifting height position of the fork 4. The load sensor 14 detects the weight of the cargo loaded on the fork 4. The lifting height sensor 13 and the load sensor 14 can detect a cargo handling operation with the cargo handling device 3, a change in a cargo loaded on the fork 4, and the like.

Unless the measurement value of the first encoder 11 and/or the second encoder 12 is 0 (including a predetermined range that can be regarded as 0), the traveling body 2 performs some operation (movement, rotation, or the like), and the operation affects the measurement value of the IMU 10 (sometimes 40 described as an IMU measurement value). When there is a change in the measurement value of the lifting height sensor 13, the fork 4 is lifted and lowered. When there is a change in the measurement value of the load sensor 14, there is a possibility that loading or unloading to or from the fork 4 is performed. In these cases, even if the forklift 1 is not traveling, there is a possibility that vibration occurs in the vehicle body and affects the IMU measurement value.

Each sensor of the IMU 10, the first encoder 11, the second encoder 12, the lifting height sensor 13, and the load sensor 14 is connected to the computation device 20, and the measurement value measured by each sensor is sent to the computation device 20. The computation device 20 includes a computer including a processor. The computation device 20 determine a position (self-position) of the forklift 1 by using the measurement value from each of the sensors described above.
Configuration of Positioning System FIG. 2 is a view illustrating an example of a positioning system according to the first embodiment.

Figure 2:
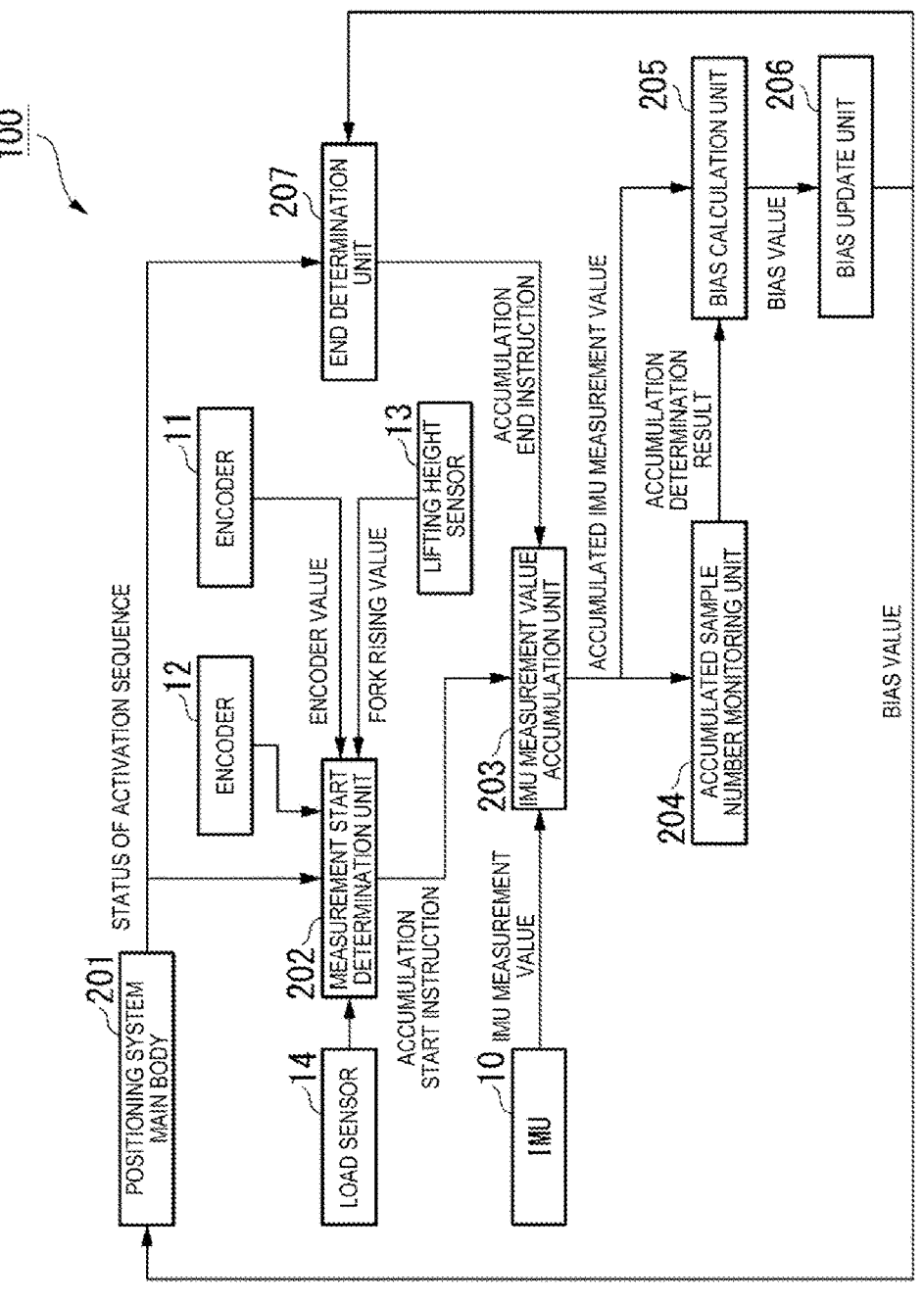
FIG. 2 is a view illustrating an example of a positioning system according to the first embodiment.

As illustrated in FIG. 2, the positioning system 100 includes a positioning system main body 201, a measurement start determination unit 202, an IMU measurement value accumulation unit 203, an accumulated sample number monitoring unit 204, a bias calculation unit 205, a bias update unit 206, an end determination unit 207, the IMU 10, the first encoder 11, the second encoder 12, the lifting height sensor 13, and the load sensor 14. Among them, the positioning system main body 201, the measurement start determination unit 202, the IMU measurement value accumulation unit 203, the accumulated sample number monitoring unit 204, the bias calculation unit 205, the bias update unit 206, and the end determination unit 207 are functions implemented in the computation device 20.

The positioning system main body 201 calculates position information (determines a position) of the forklift 1 by dead reckoning or the like based on the measurement value of the IMU 10. At this time, the positioning system main body 201 compensates the IMU measurement value by subtracting the bias value updated by the bias update unit 206 from the measurement value of the IMU 10. When position information is calculated by accumulating the IMU measurement value including a bias, the accuracy of the position information decreases. Therefore, the positioning system main body 201 calculates the position information based on an accurate IMU measurement value with bias compensation.

The measurement start determination unit 202 confirms that an unexpected vehicle operation has not occurred during the activation sequence of the positioning system 100, and determines to start accumulation of the IMU measurement value. During the activation sequence, operations such as acquisition confirmation of various sensor values and establishment of communication with another system are performed. In principle, it is assumed that the forklift 1 is not moved during the activation sequence. Since it takes some time to complete the activation sequence, it is possible to acquire the number of samples sufficient for estimation of the IMU measurement value in a state where the vehicle is purely stationary. Furthermore, in order to use, for bias estimation, the IMU measurement value of the time when the vehicle is reliably not moving, it is also confirmed that an unexpected vehicle operation does not occur in the forklift 1. The state in which the unexpected vehicle operation does not occur is, for example, a state in which the values of the first encoder 11 and the second encoder 12 are not 0, and the measurement values of the lifting height sensor 13 and the load sensor 14 change. When the forklift 1 is stationary, the IMU measurement value is 0. Therefore, if the IMU measurement value fluctuates even though the forklift 1 is stationary, the fluctuation can be recognized as a bias. However, the IMU measurement value measured during operation of the forklift 1 reflects the operation, and thus, it is difficult to detect the bias. Therefore, in the present embodiment, the measurement values of the sensors 11 to 14 other than the IMU 10 are observed to confirm that the forklift 1 is stationary, and the IMU measurement value during being stationary is accumulated to estimate the bias when it can be confirmed that the forklift 1 is stationary. Since it is thought that the forklift 1 is often stationary during the activation sequence of the positioning system 100, the measurement start determination unit 202 confirms that the forklift 1 is stationary during the activation sequence of the positioning system 100, and performs accumulation start determination of the IMU measurement value.

The IMU measurement value accumulation unit 203 includes a storage medium such as a memory and a hard disk drive (HDD). When the measurement start determination unit 202 determines to start accumulation of the IMU measurement value, the IMU measurement value accumulation unit 203 starts accumulation of the measurement value measured by the IMU 10. When the number of accumulated IMU measurement values becomes equal to or greater than a threshold (or when the storage area for accumulating the IMU measurement value becomes full), the IMU measurement value accumulation unit 203 sequentially deletes from old measurement values to release the storage area, and preferentially accumulates newly measured IMU measurement values.

The accumulated sample number monitoring unit 204 monitors the number of IMU measurement values accumulated in the IMU measurement value accumulation unit 203. When the number of accumulated IMU measurement values becomes equal to or greater than the threshold, the accumulated sample number monitoring unit 204 notifies the bias calculation unit 205 that a sufficient number of samples for estimating the bias of the IMU measurement values has been obtained.

When notified of the accumulation of the sufficient number of samples from the accumulated sample number monitoring unit 204, the bias calculation unit 205 calculates an estimation value of the bias of the IMU measurement value based on the IMU measurement value accumulated in the IMU measurement value accumulation unit 203. For example, the bias calculation unit 205 calculates an average of the IMU measurement values accumulated in the IMU measurement value accumulation unit 203, and uses the average as the bias. Alternatively, the bias calculation unit 205 may calculate a mode or a median of the IMU measurement values accumulated in the IMU measurement value accumulation unit 203, and use the calculated value as the bias.

The bias update unit 206 updates the bias value referred to by the positioning system main body 201 with a new bias value calculated by the bias calculation unit 205. The bias update unit 206 may be configured to include a storage medium such as a memory, and may be configured to store the latest bias calculated by the bias calculation unit 205.

The end determination unit 207 controls the end of the processing of estimating the bias of the IMU measurement value. For example, the end determination unit 207 confirms that the activation sequence of the positioning system 100 has ended, that an unexpected operation of the forklift 1 has occurred, or that the update of the bias has been completed, and when these can be confirmed, the end determination unit 207 ends the accumulation of the IMU measurement value and deletes the IMU measurement values accumulated so far.

Operation

Next, bias estimation processing by the positioning system 100 will be described with reference to FIG. 3.

Figure 3:
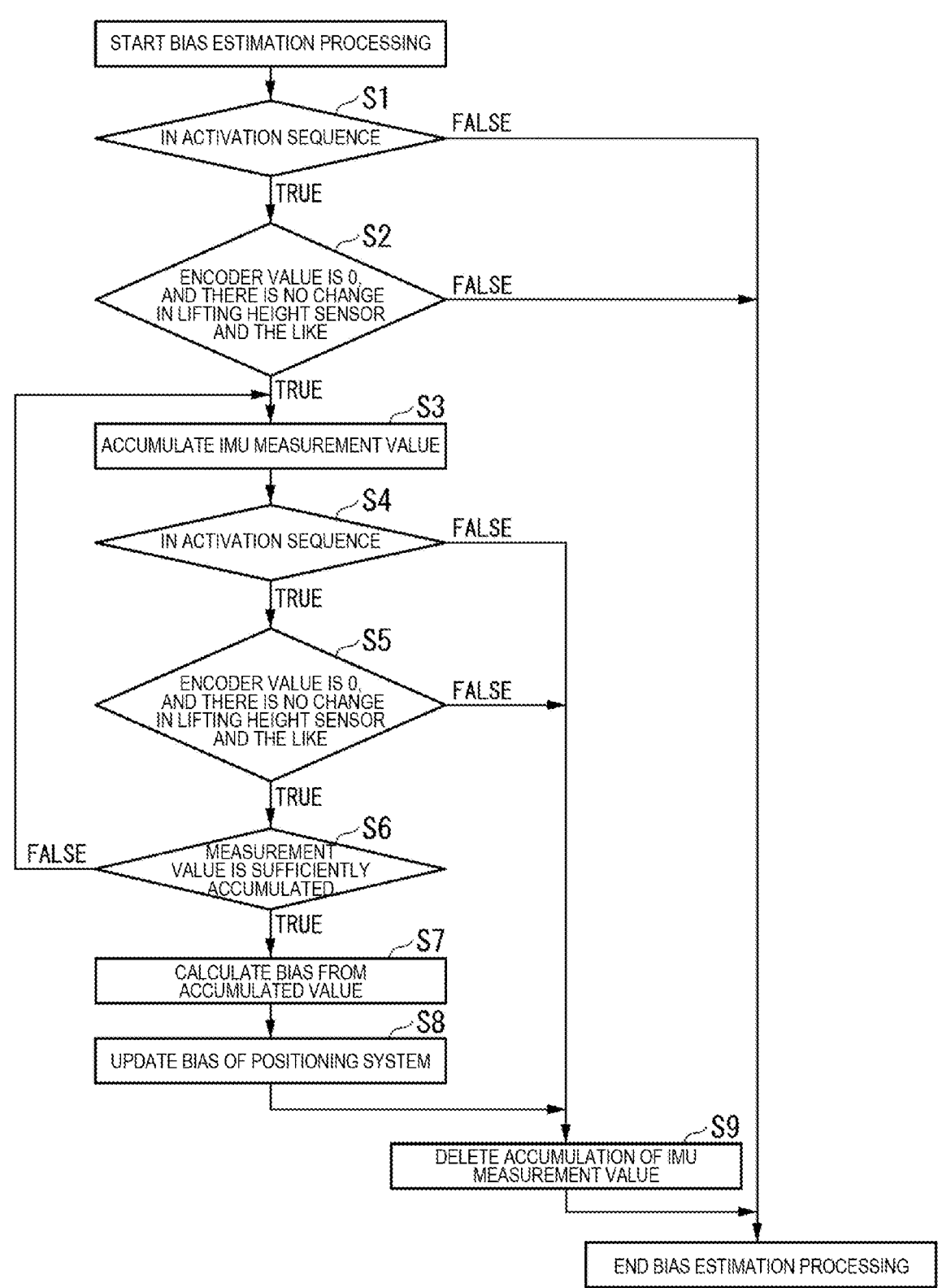
FIG. 3 is a flowchart illustrating an example of bias estimation processing according to the first embodiment.

FIG. 3 is a flowchart illustrating an example of bias estimation processing according to the first embodiment.

The measurement start determination unit 202 determines whether the positioning system 100 is in activation sequence (step S1). For example, when the worker performs an operation of turning on the power of the forklift 1, the positioning system 100 is activated, and the activation sequence is executed. The measurement start determination unit 202 monitors, for example, an execution log or the like of the activation sequence, and confirms whether the activation sequence is in execution. If the positioning system 100 is not in the activation sequence (step S1; False), the bias estimation processing ends. If the positioning system 100 is in the activation sequence (step S1; True), the measurement start determination unit 202 determines whether the measurement value from the first encoder 11 and/or the second encoder 12 is 0 and there is no change in the measurement value of the lifting height sensor 13 and the measurement value of the load sensor 14 (step S2). If the measurement value of the first encoder 11 and/or the second encoder 12 is not 0, or the measurement value of the lifting height sensor 13 or the measurement value of the load sensor 14 changes (step S2; False), the bias estimation processing ends.

If the measurement value of each sensor satisfies the above condition (step S2; True), the measurement start determination unit 202 determines to start accumulation of the IMU measurement value, and instructs the IMU measurement value accumulation unit 203 to start accumulation of the IMU measurement value. Then, the IMU measurement value accumulation unit 203 acquires a measurement value from the IMU 10 and accumulates the acquired IMU measurement value (step S3). The IMU measurement value accumulation unit 203 writes and stores the IMU measurement value in the storage medium. While the IMU measurement value accumulation unit 203 accumulates the IMU measurement value, the end determination unit 207 determines whether the positioning system 100 is in the activation sequence (step S4). For example, the end determination unit 207 monitors the execution log or the like of the activation sequence, and confirms whether the activation sequence is in execution. If the positioning system 100 is not in the activation sequence (step S4; False), the end determination unit 207 deletes the IMU measurement value 5 accumulated in the IMU measurement value accumulation unit 203 (step S9), and ends the bias estimation processing. If the positioning system 100 is in the activation sequence (step S4; True), the end determination unit 207 determines whether the measurement value from the first encoder 11 and/or the second encoder 12 is 0 and there is no change in the measurement value of the lifting height sensor 13 and the measurement value of the load sensor 14 (step S5). If this condition is not satisfied (step S5; False), the end determination unit 207 deletes the IMU measurement value accumulated in the IMU measurement value accumulation unit 203 (step S9), and ends the bias estimation processing.

If the measurement value of each sensor satisfies the above condition (step S5; True), the accumulated sample number monitoring unit 204 determines whether the IMU measurement value accumulation unit 203 has accumulated a sufficient number of IMU measurement values (step S6). For example, the accumulated sample number monitoring unit 204 compares the number of IMU measurement values stored in the IMU measurement value accumulation unit 203 with the threshold, and determines whether a sufficient number of IMU measurement values is accumulated. If the IMU measurement values have not been sufficiently accumulated (step S6; False), the processing in and after step S3 is repeatedly executed. If the IMU measurement values are sufficiently accumulated (step S6; True), the bias calculation unit 205 calculates the bias (step S7). For example, the bias calculation unit 205 calculates any of the average, the median, and the mode of the IMU measurement values stored in the IMU measurement value accumulation unit 203. The bias calculation unit 205 outputs the calculated value to the bias update unit 206. The bias update unit 206 updates the bias of the positioning system 100 (the bias value referred to by the positioning system main body 201) (step S8). For example, the bias update unit 206 outputs the bias acquired from the bias calculation unit 205 to the positioning system main body 201. The positioning system main body 201 compensates the IMU measurement value using the bias acquired from the bias update unit 206, and performs positioning of the forklift 1 based on the compensated IMU measurement value. Next, the end determination unit 207 deletes the IMU measurement value accumulated in the IMU measurement value accumulation unit 203 (step S9), and ends the bias estimation processing.

Effects

As described above, the present embodiment determines that the forklift 1 is in the stationary state suitable for bias calculation of the IMU measurement value by the facts that (1) the positioning system 100 that estimates the self-position of the forklift 1 is in the activation sequence, that (2) the measurement value of the first encoder 11 and/or the second encoder 12 that detects the operation related to movement of the forklift 1 indicates that the forklift 1 is not in operation (these measurement values become 0), and that (3) the measurement value of the lifting height sensor 13 and/or the load sensor 14 indicates that the forklift 1 is not in cargo handling operation using the forklift 1 (there is no fluctuation in these measurement values) and performs estimation of the bias when it is confirmed that the positioning system 100 is activated and the forklift 1 is stationary (not moving nor in cargo handling operation). Further confirming that the forklift 1 is stationary during the activation sequence, which is a situation where the vehicle is stationary in principle then accumulating the IMU measurement value, and using the data allows the bias to be estimated with higher accuracy. Estimating the bias with high accuracy can accurately determine a position of the forklift 1.

Second Embodiment

Figure 4:
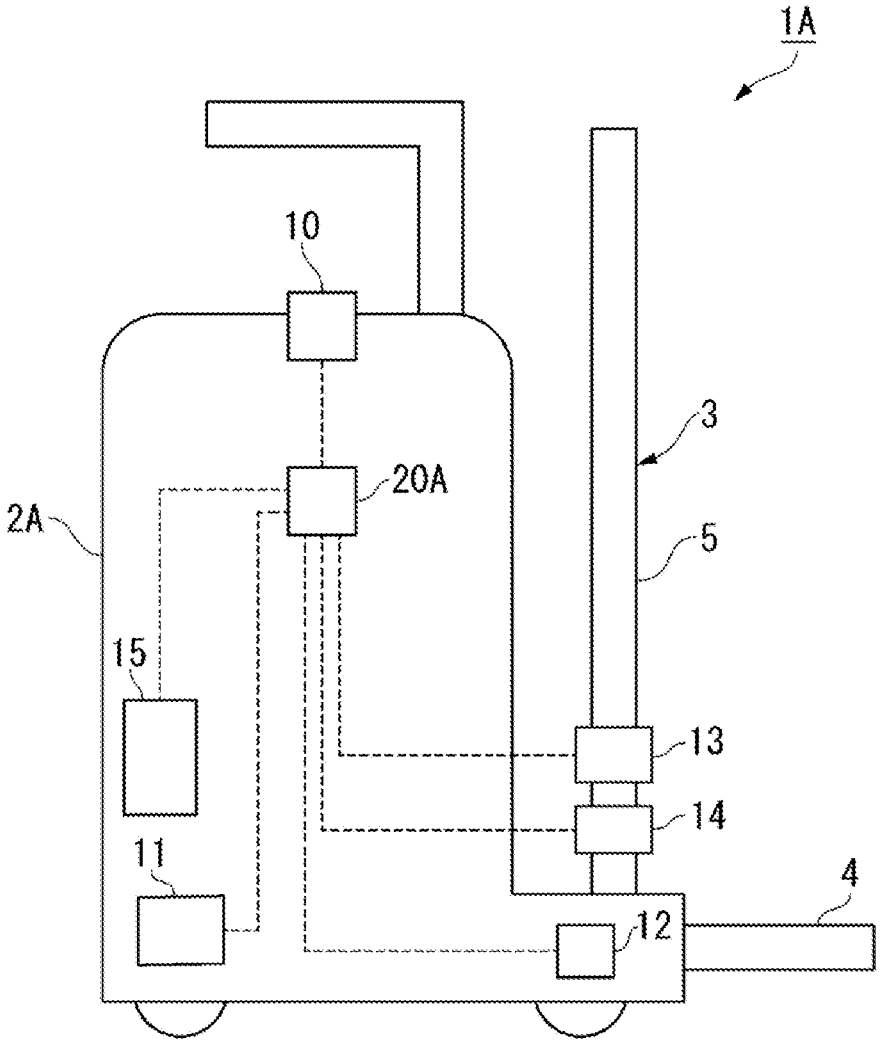
FIG. 4 is a schematic diagram illustrating an example of a forklift according to a second embodiment.

A positioning system 100A according to the second embodiment of the disclosure will be described below with reference to FIGS. 4 to 6. In the first embodiment, the bias is estimated by confirming that the forklift 1 is not operating during the activation sequence of the positioning system 100. On the other hand, in the second embodiment, the bias is estimated during the charging of a forklift 1A by using the fact that there is a high possibility that no operation occurs in the forklift 1A being charged.
Configuration of Forklift FIG. 4 is a schematic diagram illustrating an example of a forklift according to the second embodiment.

The forklift 1A is an electric (rechargeable) forklift. The forklift 1A includes a traveling body 2A, the cargo handling device 3, and a computation device 20A. The traveling body 2A is provided with a vehicle charging system in addition to the IMU 10 and the like. The vehicle charging system 15 includes a secondary battery and a charge/discharge circuit. The vehicle charging system 15 receives power supply from a commercial power source and charges the secondary battery. The vehicle charging system 15 drives the forklift 1A by discharging from the secondary battery and supplying the discharged electric power to each unit. The vehicle charging system 15 is connected to the computation device 20A. The vehicle charging system 15 notifies the computation device 20A of the charge/discharge state (for example, notification of charge start or notification of charge end) of the secondary battery. Next, the computation device 20A will be described with reference to FIG. 5. Other configurations of the forklift 1A are similar to those of the forklift 1 of the first embodiment.
Configuration of Positioning System FIG. 5 is a view illustrating an example of a positioning system according to the second embodiment.

Figure 5:
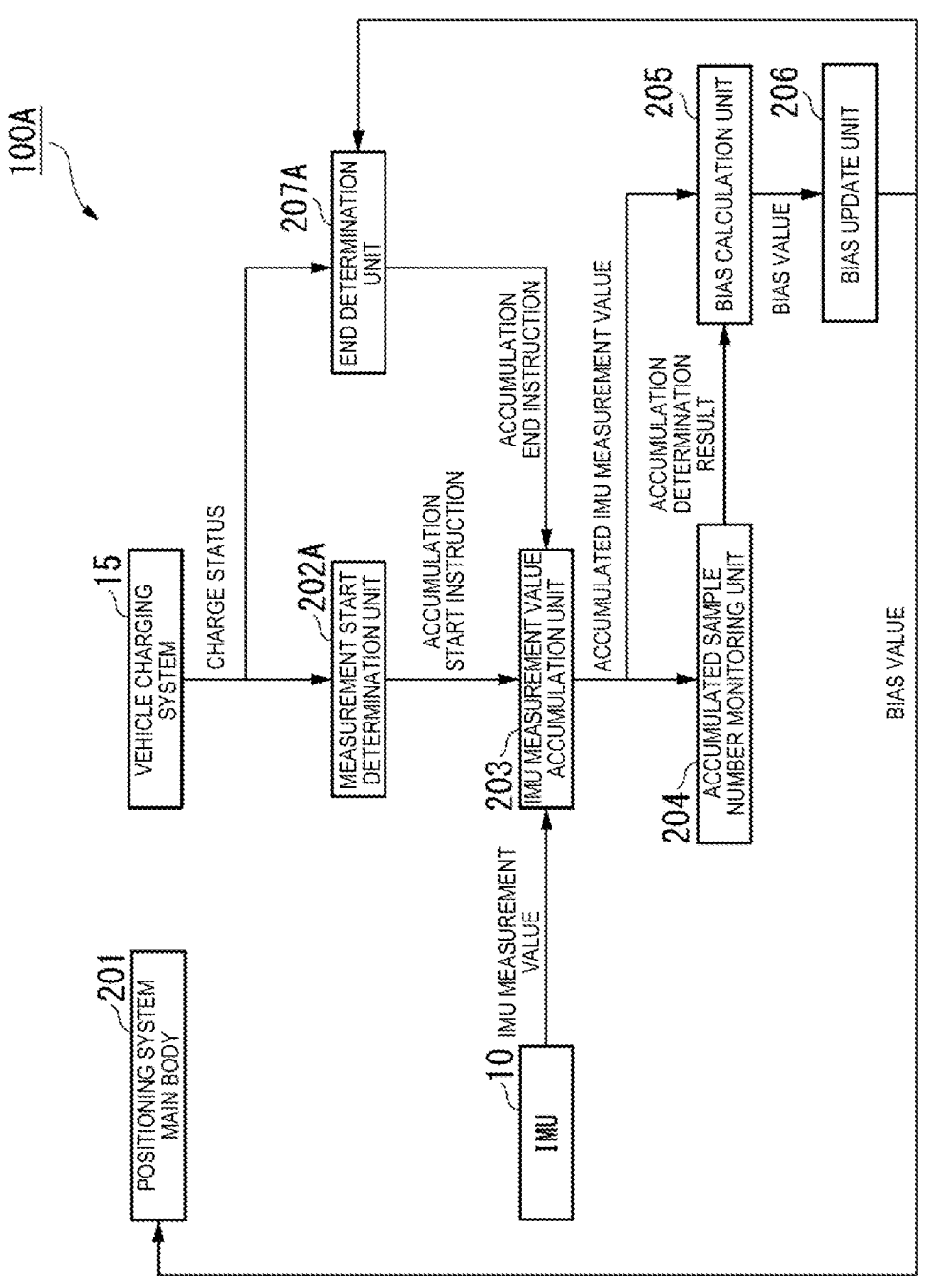
FIG. 5 is a view illustrating an example of a positioning system according to the second embodiment.
Figure 6:
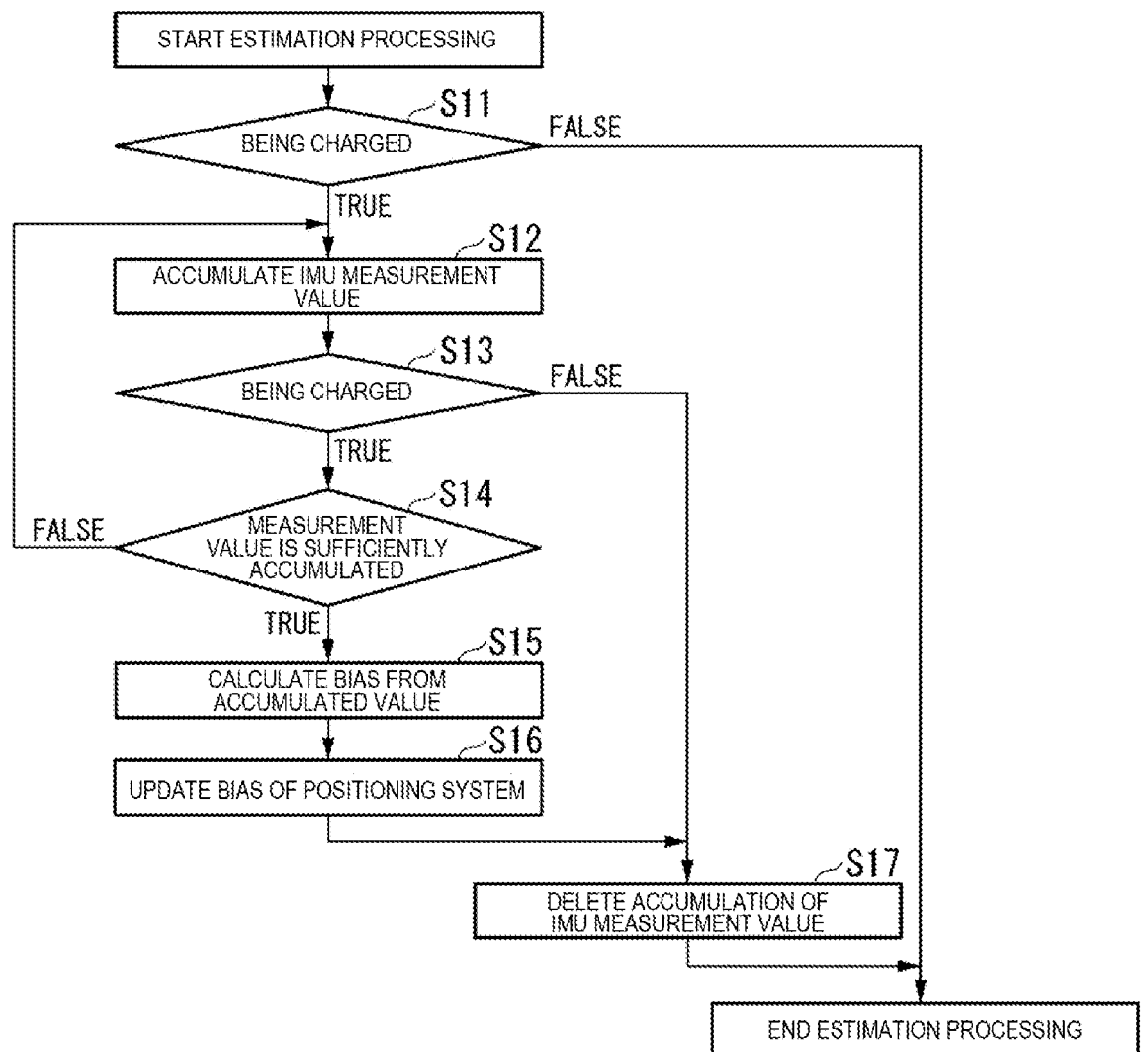
FIG. 6 is a flowchart illustrating an example of bias estimation processing according to the second embodiment.

As illustrated in FIG. 5, the positioning system 100A includes the positioning system main body 201, a measurement start determination unit 202A, the IMU measurement value accumulation unit 203, the accumulated sample number monitoring unit 204, the bias calculation unit 205, the bias update unit 206, the end determination unit 207A, and the IMU 10. Among them, the positioning system main body 201, the measurement start determination unit 202A, the IMU measurement value accumulation unit 203, the accumulated sample number monitoring unit 204, the bias calculation unit 205, the bias update unit 206, and the end determination unit 207A are implemented in the computation device 20A. In the configuration according to the second embodiment, the same reference numerals are given to the same components as those of the positioning system 100 according to the first embodiment, and the description thereof will be omitted. In the present embodiment, if the forklift 1A is being charged, it is thought that the forklift 1A does not operate during the charging and that the IMU measurement value suitable for calculating the bias value can be collected.

The measurement start determination unit 202A performs accumulation start determination of the IMU measurement value based on the notification of the charge/discharge state from the vehicle charging system 15. For example, upon receiving a notification of charge start from the vehicle charging system the measurement start determination unit 202A determines to start accumulation of the IMU measurement value.

The end determination unit 207A performs accumulation end determination of the IMU measurement value based on the notification of the charge/discharge state from the vehicle charging system 15. For example, upon receiving a notification of charge completion from the vehicle charging system the measurement start determination unit 202A determines to end the accumulation of the IMU measurement value. Alternatively, when the bias is updated by the bias update unit 206, the measurement start determination unit 202A determines to end the accumulation of the IMU measurement value.

Operation

Next, bias estimation processing by the positioning system 100A will be described with reference to FIG. 6. FIG. 6 is a flowchart illustrating an example of bias estimation processing according to the second embodiment. The measurement start determination unit 202A determines whether the forklift 1A is being charged (step S11). Upon receiving a notification of charge start from the vehicle charging system 15, the measurement start determination unit 202A determines that the forklift 1A is being charged. If not being charged (step S11; False), the bias estimation processing ends. If being charged (step S11; True), the measurement start determination unit 202A determines to start accumulation of the IMU measurement value. The measurement start determination unit 202A instructs the IMU measurement value accumulation unit 203 to start accumulation of the IMU measurement value. Then, the IMU measurement value accumulation unit 203 acquires the measurement value from the IMU 10 and accumulates the acquired IMU measurement value (step S12). While the IMU measurement value accumulation unit 203 is accumulating the IMU measurement value, the end determination unit 207A monitors whether the forklift 1A is being charged (step S13). The measurement start determination unit 202A determines that charging is being performed until receiving the notification of charge completion from the vehicle charging system 15, and determines that charging is not being performed after receiving the notification of charge completion. If not being charged (step S13; False), the end determination unit 207A deletes the IMU measurement value accumulated in the IMU measurement value accumulation unit 203 (step S17), and ends the bias estimation processing.

If being charged (step S13; True), the accumulated sample number monitoring unit 204 determines whether the IMU measurement value accumulation unit 203 has accumulated a sufficient number of IMU measurement values (step S14). If the IMU measurement values have not been sufficiently accumulated (step S14; False) the processing in and after step S12 is repeatedly executed. If the IMU measurement values are sufficiently accumulated (step S14; True), the bias calculation unit 205 calculates the bias (step S15). For example, the bias calculation unit 205 calculates any of the average, the median, and the mode of the IMU measurement values stored in the IMU measurement value accumulation unit 203. The bias calculation unit 205 outputs the calculated value to the bias update unit 206. The bias update unit 206 updates the bias of the positioning system 100A (step S16). For example, the bias update unit 206 outputs the latest bias calculated by the bias calculation unit 205 to the positioning system main body 201. The positioning system main body 201 compensates the IMU measurement value using the bias value acquired from the bias update unit 206, and performs positioning of the forklift 1A. Next, the end determination unit 207A deletes the IMU measurement value accumulated in the IMU measurement value accumulation unit 203 (step S17), and ends the bias estimation processing.

Effects

As described above, according to the present embodiment, for the electric forklift 1A, the IMU measurement value is accumulated using the fact that the vehicle is stationary during charging, and the bias value is calculated. At the time of charging the forklift 1A, the forklift 1A is highly likely to be in a stationary state (unexpected situation is less likely to occur) as compared with during the activation sequence of the positioning system 100A, and therefore, bias estimation can be more stably performed with high accuracy, and positioning can be performed with high accuracy.

Similar to the first embodiment, the second embodiment may confirm that the forklift 1A is not in operation (for example, steps S2 and S6 in FIG. 3) based on the measurement values of the first encoder 11, the second encoder 12, the lifting height sensor 13, and the load sensor 14 and calculate the bias of the IMU measurement value only when the forklift 1A is being charged and not in operation.

Third Embodiment

A positioning system 100B according to the third embodiment of the disclosure will be described below with reference to FIGS. 7 and 8. In the first embodiment, the bias is estimated by confirming that the forklift 1 is not operating during the activation sequence of the positioning system 100. On the other hand, in the third embodiment, the bias of the IMU measurement value is estimated unless the forklift 1 is operating regardless of whether the 5 positioning system 100 is in activation sequence. The configuration of the forklift according to the third embodiment is similar to that of the forklift 1 according to the first embodiment.

Configuration of Positioning System

Figure 7:
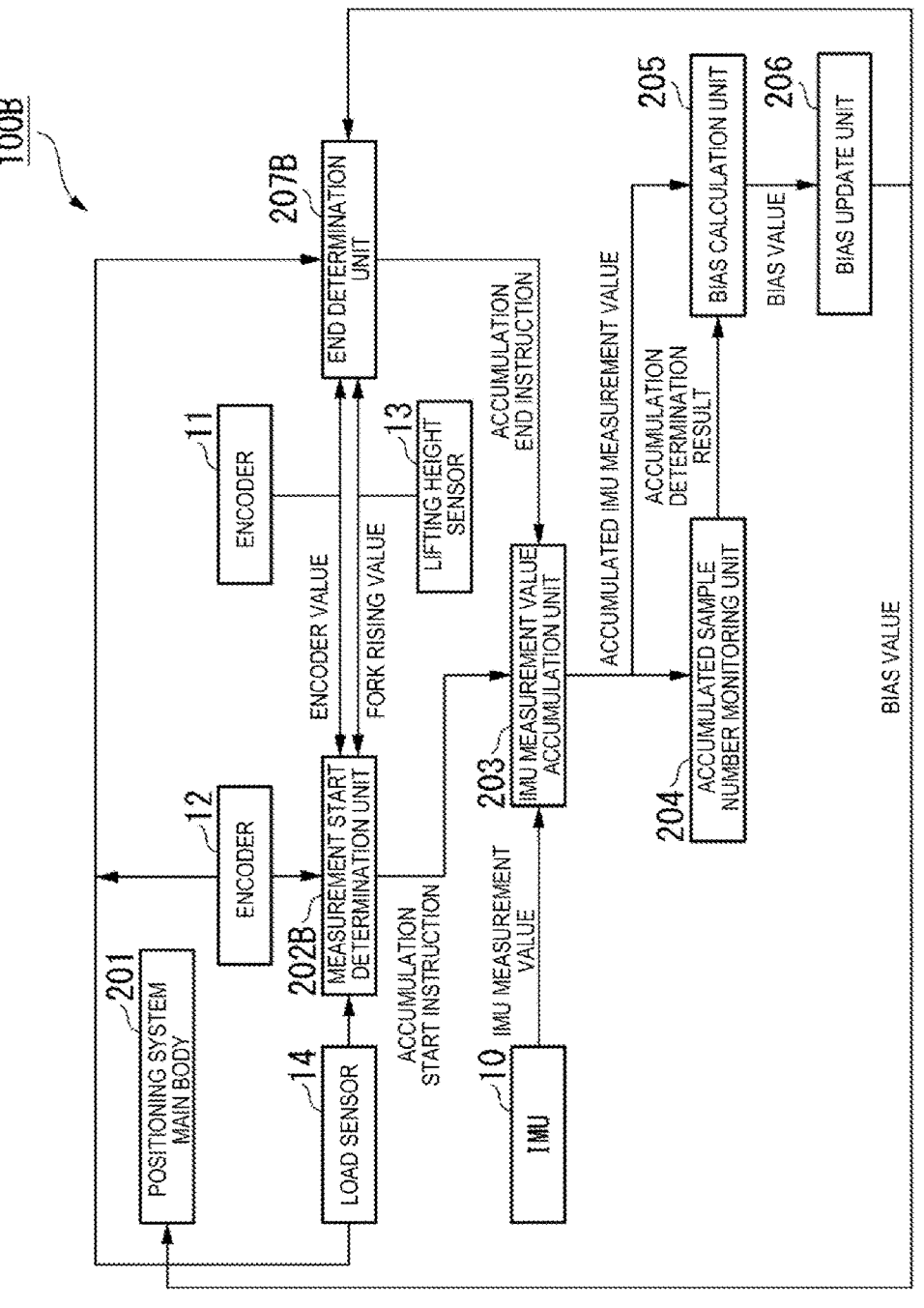
FIG. 7 is a view illustrating an example of a positioning system according to a third embodiment.
Figure 8:
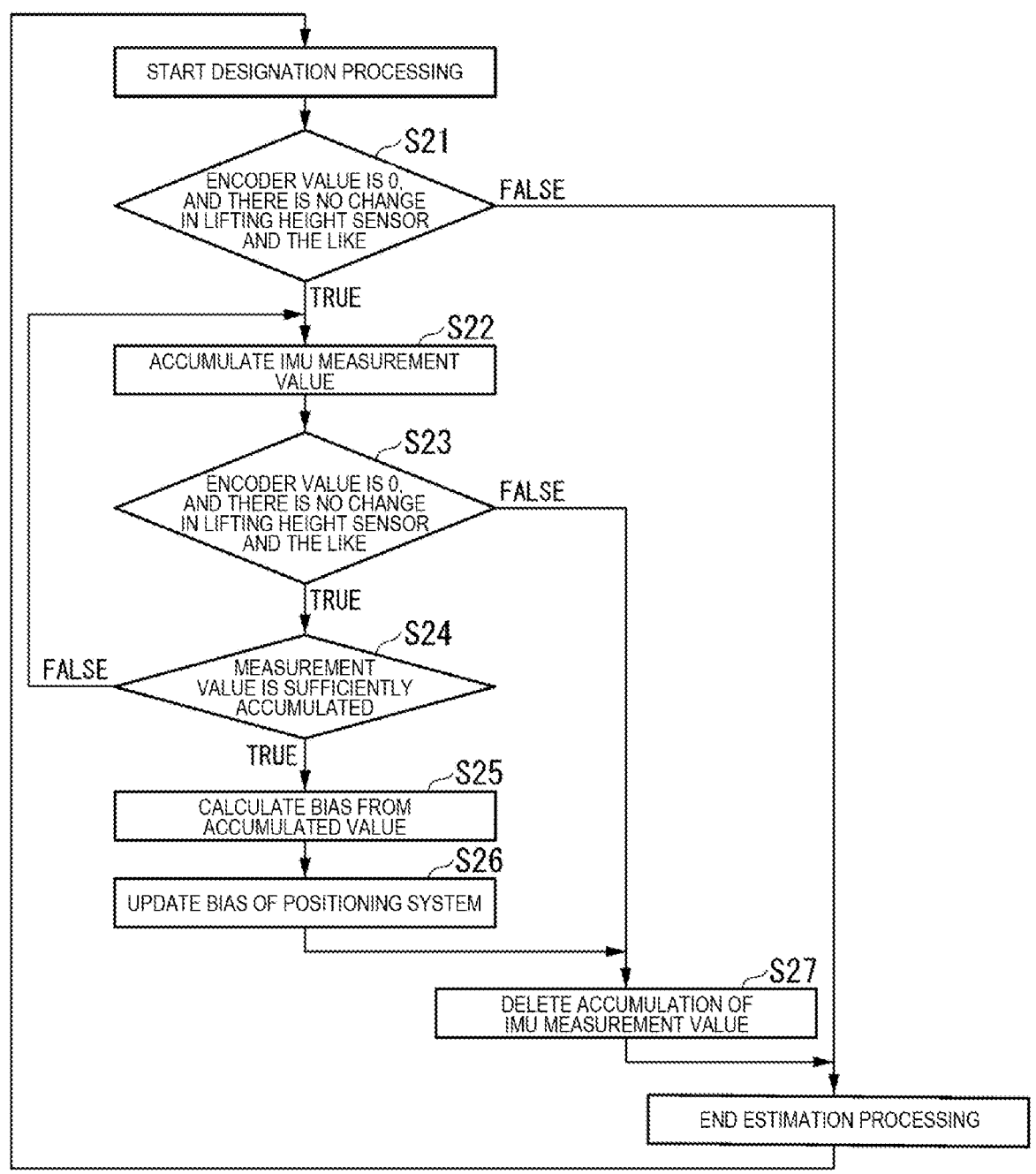
FIG. 8 is a flowchart illustrating an example of bias estimation processing according to the third embodiment.

FIG. 7 is a view illustrating an example of a positioning system according to the third embodiment.

As illustrated in FIG. 7, the positioning system 100B includes the positioning system main body 201, a measurement start determination unit 202B, the IMU measurement value accumulation unit 203, the accumulated sample number monitoring unit 204, the bias calculation unit 205, the bias update unit 206, an end determination unit 207B, the IMU 10, the first encoder 11, the second encoder 12, the lifting height sensor 13, and the load sensor 14. Among them, the positioning system main body 201, the measurement start determination unit 202B, the IMU measurement value accumulation unit 203, the accumulated sample number monitoring unit 204, the bias calculation unit 205, the bias update unit 206, and the end determination unit 207B are implemented in a computation device 20B (not illustrated). In the configuration according to the third embodiment, the same reference numerals are given to the same components as those of the positioning system 100 according to the first embodiment, and the description thereof will be omitted.

The measurement start determination unit 202B confirms that the forklift 1 is stationary, and performs accumulation start determination of the IMU measurement value.

The end determination unit 207B determines to end the accumulation of the IMU measurement value when the forklift 1 starts some operation. The other functions are similar to those of the end determination unit 207 of the first embodiment.

Operation

Next, bias estimation processing by the positioning system 100B will be described with reference to FIG. 8. FIG. 8 is a flowchart illustrating an example of bias estimation processing according to the third embodiment.

The measurement start determination unit 202B determines whether the 40 measurement value from the first encoder 11 and/or the second encoder 12 is 0 and there is no change in the measurement value of the lifting height sensor 13 and the measurement value of the load sensor 14 (step S21). If the measurement value of the first encoder 11 and/or the second encoder 12 is not or the measurement value of the lifting height sensor 13 or the measurement value of the load sensor 14 changes (step S21; False), the bias estimation processing ends.

If the measurement value of each sensor satisfies the above condition (step S21; True), the measurement start determination unit 202B determines to start accumulation of the IMU measurement value, and instructs the IMU measurement value accumulation unit 203 to start accumulation of the IMU measurement value. Then, the IMU measurement value accumulation unit 203 acquires the measurement value from the IMU 10 and accumulates the acquired IMU measurement value (step S22). While the IMU measurement value accumulation unit 203 accumulates the IMU measurement value, the end determination unit 207B determines whether the measurement value from the first encoder 11 and/or the second encoder 12 is 0 and there is no change in the measurement value of the lifting height sensor 13 and the measurement value of the load sensor 14 (step S23). If this condition is not satisfied (step S23; False), the end determination unit 207B deletes the IMU measurement value accumulated in the IMU measurement value accumulation unit 203 (step S27), and ends the bias estimation processing.

If the measurement value of each sensor satisfies the above condition (step S23; True), the accumulated sample number monitoring unit 204 determines whether the IMU measurement value accumulation unit 203 has accumulated a sufficient number of IMU measurement values (step S24). If the IMU measurement values have not been sufficiently accumulated (step S24; False) the processing in and after step S22 is repeatedly executed. If the IMU measurement values are sufficiently accumulated (step S24; True), the bias calculation unit 205 calculates the bias (step S25). Next, the bias update unit 206 updates the bias of the positioning system 100B (step S26). The positioning system main body 201 compensates the IMU measurement value using the bias updated by the bias update unit 206, and performs positioning of the forklift 1. Next, the end determination unit 207B deletes the IMU measurement value accumulated in the IMU measurement value accumulation unit 203 (step S27), and ends the bias estimation processing. The series of processing in steps S21 to S27 may be repeatedly executed while the forklift 1 is in operation.

Effects

As described above, the present embodiment can estimate the bias as long as the forklift 1 is stationary even when the positioning system 100B is not in the activation sequence. This can perform bias estimation if conditions are satisfied in another situation even when, for example, the worker performs some operation on the forklift 1 during the activation sequence and misses an opportunity of bias estimation. Since the bias of the IMU measurement value may change with time, even during the operation of the forklift 1, a section in which the vehicle is highly likely to be stationary is found, and the bias estimation is performed based on the IMU measurement value measured in the section, whereby the positioning can be always performed using the (latest) bias after the change with time.

Instead of or in addition to determining whether the forklift 1 is stationary based on the measurement values of the first encoder 11, the second encoder 12, the lifting height sensor 13, and the load sensor 14, the measurement start determination unit 202B and the end determination unit 207B is configured to detect whether a brake is applied to the forklift 1, and the IMU measurement value may be accumulated to estimate the bias when the brake is applied. The third embodiment can be combined with any of the first embodiment and the second embodiment.

Fourth Embodiment

A positioning system 100C according to the fourth embodiment of the disclosure will be described below with reference to FIGS. 9 and 10. With the manned forklift 1, there is a case where a worker performs work while stopping, and in this case, even when the traveling body 2 is stopped, the motion of the worker may affect the IMU measurement value. Examples of such motions of the worker include reading of a barcode of a cargo, an in-vehicle terminal operation of a warehouse management system, unloading/loading a plurality of cargoes loaded on a pallet, and getting on/off the forklift 1, and there is a possibility that the vehicle body vibrates or the orientation changes with each movement. Therefore, in the fourth embodiment, a sudden change in the measurement value considered to be caused by the operation of the worker is detected from the IMU measurement value, and the IMU measurement values before and after the detection timing are excluded from the computation target of the bias estimation, thus preventing accuracy deterioration in the bias estimation. The configuration of the forklift according to the fourth embodiment is similar to that of the forklift 1 according to the first embodiment.

Configuration of Positioning System

Figure 9:
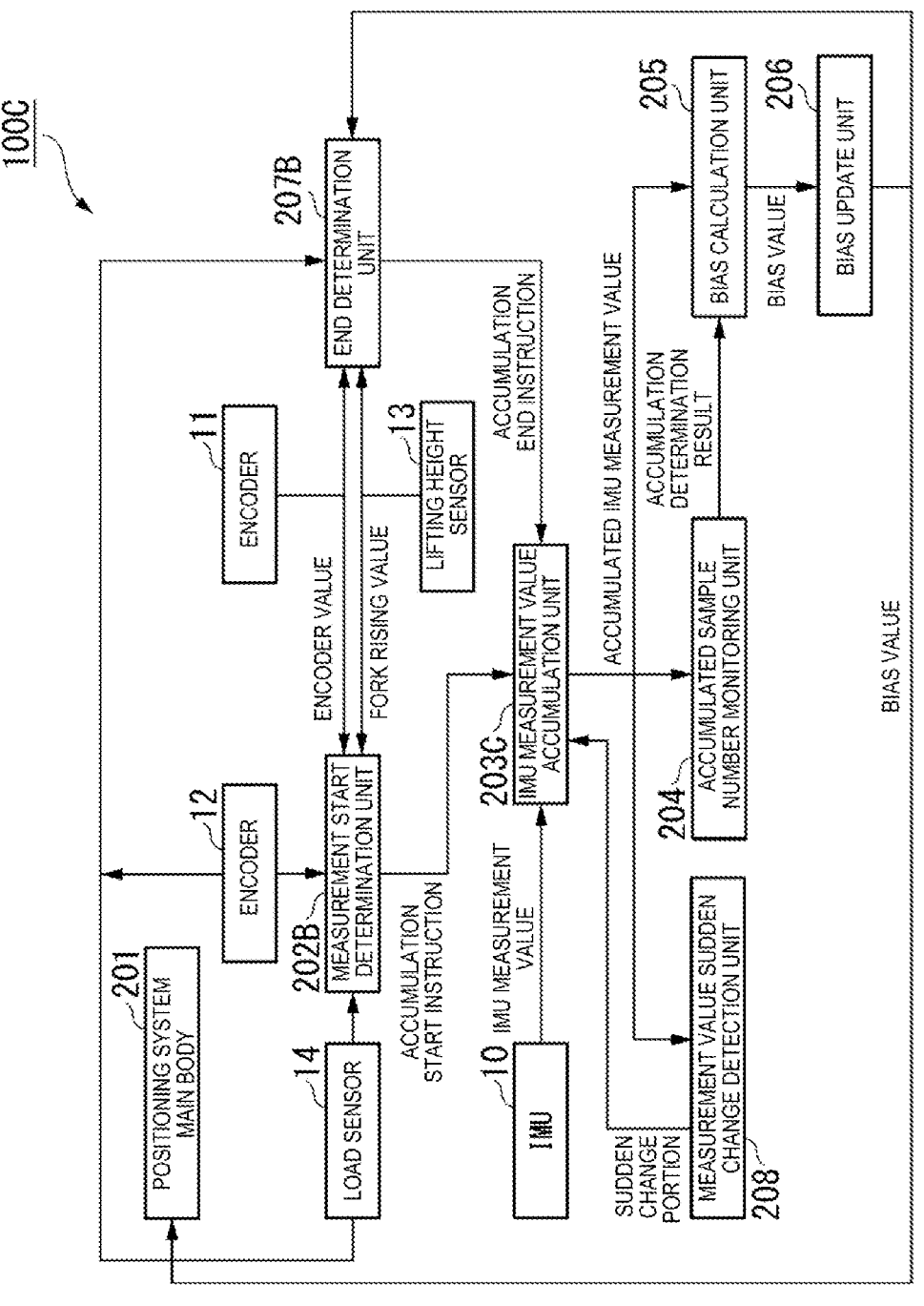
FIG. 9 is a view illustrating an example of a positioning system according to a fourth embodiment.
Figure 10:
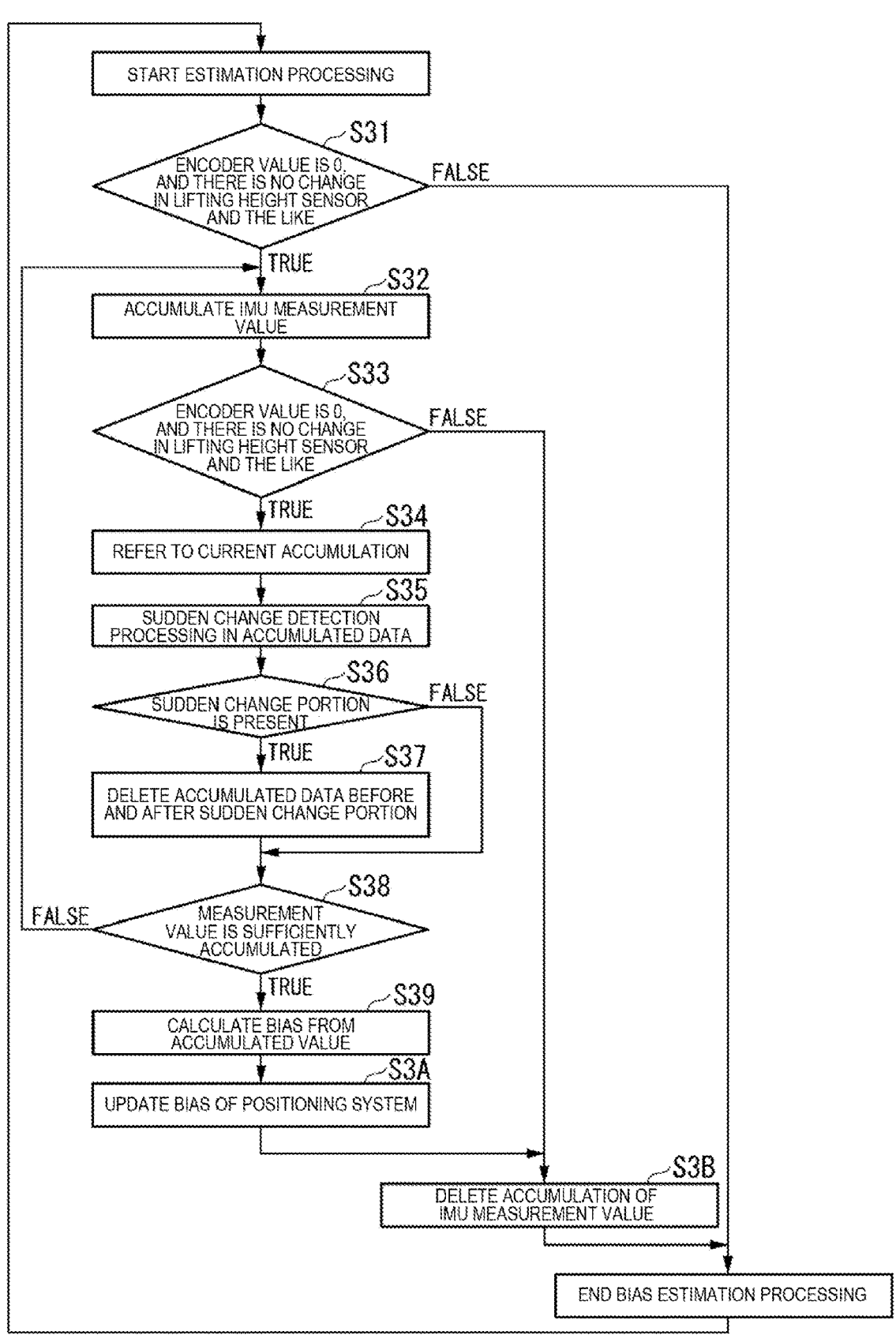
FIG. 10 is a flowchart illustrating an example of bias estimation processing according to the fourth embodiment.

FIG. 9 is a view illustrating an example of a positioning system according to the fourth embodiment. Although the fourth embodiment can be combined with any of the configurations of the first to third embodiments, FIG. 9 illustrates a configuration example of being combined with the third embodiment. As illustrated in FIG. 9, the positioning system 100C includes the positioning system main body 201, the measurement start determination unit 202B, an IMU measurement value accumulation unit 203C, the accumulated sample number monitoring unit 204, the bias calculation unit 205, the bias update unit 206, the end determination unit 207B, the measurement value sudden change detection unit 208, the IMU 10, the first encoder 11, the second encoder 12, the lifting height sensor 13, and the load sensor 14. Among them, the positioning system main body 201, the measurement start determination unit 202B, the IMU measurement value accumulation unit 203C, the accumulated sample number monitoring unit 204, the bias calculation unit 205, the bias update unit 206, and the end determination unit 207B, and the measurement value sudden change detection unit 208 are implemented on a computation device 20C (not illustrated). In the configuration according to the fourth embodiment, the same reference numerals are given to the same components as those of the positioning system 100 according to the first embodiment, and the description thereof will be omitted. The measurement start determination unit 202B and the end determination unit 207B are as described in the third embodiment.

The IMU measurement value accumulation unit 203C has a function of deleting previous and subsequent data including a sudden change portion of the IMU measurement value due to the operation of the worker, in addition to the function described in the first embodiment.

With reference to the IMU measurement value accumulated in the IMU measurement value accumulation unit 203C, the measurement value sudden change detection unit 208 detects a sudden change portion from the data of the IMU measurement value accumulated, and notifies the IMU measurement value accumulation unit 203C of the result. The sudden change portion of the IMU measurement value detected by the measurement value sudden change detection unit 208 is applicable not only to the operation of the worker but also to the detection of vibration caused by a sudden stop of the vehicle. The manned forklift 1 has a high vehicle speed during operation, and some vehicle body vibration may occur immediately after the vehicle stops. In such situation, no change may occur in the measurement values of the first encoder 11, the second encoder 12, the lifting height sensor 13, and the load sensor 14, and for example, accumulation of the IMU measurement value may be started by the bias estimation processing described in the third embodiment. However, the vehicle body actually vibrates, and an influence may appear on the IMU measurement value. Applying the fourth embodiment can remove data unsuitable for bias estimation from the IMU measurement value accumulated in such situation.

Operation

Next, bias estimation processing by the positioning system 100C will be described with reference to FIG. 10. FIG. 10 is a flowchart illustrating an example of bias estimation processing according to the fourth embodiment.

The measurement start determination unit 202B determines whether the measurement value from the first encoder 11 and/or the second encoder 12 is 0 and there is no change in the measurement value of the lifting height sensor 13 and the measurement value of the load sensor 14 (step S31). If the measurement value of the first encoder 11 and/or the second encoder 12 is not or the measurement value of the lifting height sensor 13 or the measurement value of the load sensor 14 changes (step S31; False), the bias estimation processing ends.

If the measurement value of each sensor satisfies the above condition (step S31; True), the measurement start determination unit 202B determines to start accumulation of the IMU measurement value, and instructs the IMU measurement value accumulation unit 203C to start accumulation of the IMU measurement value. Then, the IMU measurement value accumulation unit 203C acquires the measurement value from the IMU 10 and accumulates the acquired IMU measurement value (step S32). While the IMU measurement value accumulation unit 203 accumulates the IMU measurement value, the end determination unit 207B determines whether the measurement value from the first encoder 11 and/or the second encoder 12 is 0 and there is no change in the measurement value of the lifting height sensor 13 and the measurement value of the load sensor 14 (step S33). If this condition is not satisfied (step S33; False), the end determination unit 207B deletes the IMU measurement value accumulated in the IMU measurement value accumulation unit 203C (step S3B), and ends the bias estimation processing.

If the measurement value of each sensor satisfies the above condition (step S33; True), the measurement value sudden change detection unit 208 refers to the IMU measurement value accumulated in the IMU measurement value accumulation unit 203C (step S34). The measurement value sudden change detection unit 208 executes a sudden change detection processing of detecting a sudden change portion from the accumulated data (step S35). The measurement value sudden change detection unit 208 determines whether the sudden change portion can be detected (step S36). If failing to detect the sudden change portion (step S36; False), the process proceeds to step S38. When the sudden change portion can be detected (step S36; True), the measurement value sudden change detection unit 208 notifies the IMU measurement value accumulation unit 203C of information on the sudden change portion (for example, the start time and the end time of the sudden change portion). The IMU measurement value accumulation unit 203C deletes the IMU measurement values at the sudden change portion and before and after the sudden change portion (a predetermined range before and after the sudden change portion in time series) from the time-series data of the IMU measurement value accumulated (step S37).

Regarding the processing of steps S35 and S37, for example, the measurement value sudden change detection unit 208 specifies, as a sudden change portion, a section including data having a deviation of equal to or greater than a certain width from the average of the IMU measurement values in a temporally continuous section in the accumulated data. The IMU measurement value accumulation unit 203C deletes the IMU measurement values in the specified section and before and after the specified section (for example, 0.5 seconds before and after). Alternatively, the measurement value sudden change detection unit 208 applies a random sample consensus (RANSAC) algorithm to the accumulated IMU measurement value data to determine an outlier and a normal value. The IMU measurement value accumulation unit 203C deletes the IMU measurement value determined to be an outlier and the values before and after the IMU measurement value. Alternatively, the measurement value sudden change detection unit 208 may construct a model that learns and distinguishes the data not including the sudden change portion remaining after step S37 and the data deleted in step S37, and detect the sudden change portion of the IMU measurement value. For example, the measurement value sudden change detection unit 208 constructs a model by the k-nearest neighbor algorithm or the like, and determines whether each piece of data accumulated in the IMU measurement value accumulation unit 203C is data that belongs to the sudden change portion based on the learned model. The IMU measurement value accumulation unit 203C deletes data determined to belong to the sudden change portion and data before and after the data.

Next, the accumulated sample number monitoring unit 204 determines whether the IMU measurement value accumulation unit 203C has accumulated a sufficient number of IMU measurement values (step S38). If the IMU measurement values have not been sufficiently accumulated (step S38; False) the processing in and after step S32 is repeatedly executed. If the IMU measurement values are sufficiently accumulated (step S38; True), the bias calculation unit 205 calculates the bias (step S39). Next, the bias update unit 206 updates the bias of the positioning system 100D (step S3A). The positioning system main body 201 compensates the IMU measurement value using the bias updated by the bias update unit 206, and performs positioning of the forklift 1. Next, the end determination unit 207B deletes the IMU measurement value accumulated in the IMU measurement value accumulation unit 203C (step S3B), and ends the bias estimation processing. The series of processing in steps S31 to S3B may be repeatedly executed while the forklift 1 is in operation.

Effects

As described above, according to the present embodiment, it is possible to avoid the influence of operation of the worker or sudden stop of the forklift 1 on the bias estimation and to estimate the bias more appropriately.

Fifth Embodiment

Hereinafter, bias estimation according to the fifth embodiment of the disclosure will be described with reference to FIGS. 11 to 13. A main factor of changing the bias of the IMU measurement value is temperature change. In a manned forklift, there is a case of moving back and forth between a normal temperature region and a freezing/refrigerating warehouse, where a temperature change is large, and therefore, there is a high possibility that the bias changes depending on the position of the forklift. Thus, in the fifth embodiment, the ambient temperature change is detected by using a thermometer attached to the vehicle body, and the bias is estimated after the temperature change and when the vehicle is stationary.

In the first to fourth embodiments, the bias is estimated if the number of samples of the IMU measurement values measured when the forklifts 1 and 1A is determined to be stationary is sufficient. However, in consideration of limited calculation resources of the computation devices 20 to 20C (in-vehicle device), a case where it is better to reduce the number of times of execution of the bias estimation processing is assumed. Thus, in the fifth embodiment, a series of bias estimation processing is performed only when the temperature change becomes equal to or greater than a reference, reducing the calculation load.

Configuration of Forklift

Figure 11:
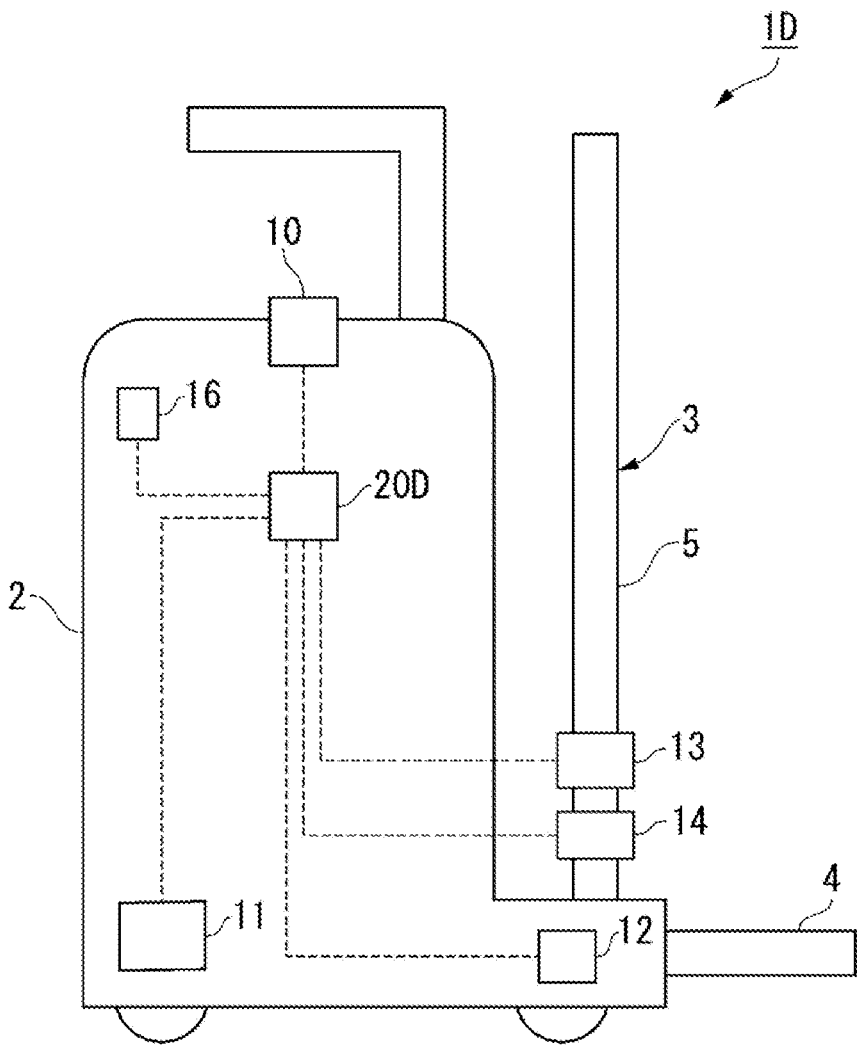
FIG. 11 is a schematic diagram illustrating an example of a forklift according to a fifth embodiment.

FIG. 11 is a schematic diagram illustrating an example of a forklift according to the fifth embodiment.

A forklift 1D includes a traveling body 2D, the cargo handling device 3, and a computation device 20D. The traveling body 2D is provided with a temperature sensor 16. The temperature sensor 16 measures an air temperature (temperature value) around the forklift 1D. The temperature sensor 16 is connected to the computation device 20D, and the temperature value measured by the temperature sensor 16 is sent to the computation device 20D. Other configurations of the forklift 1D are similar to those of the forklift 1 of the first embodiment.

Configuration of Positioning System

Figure 12:
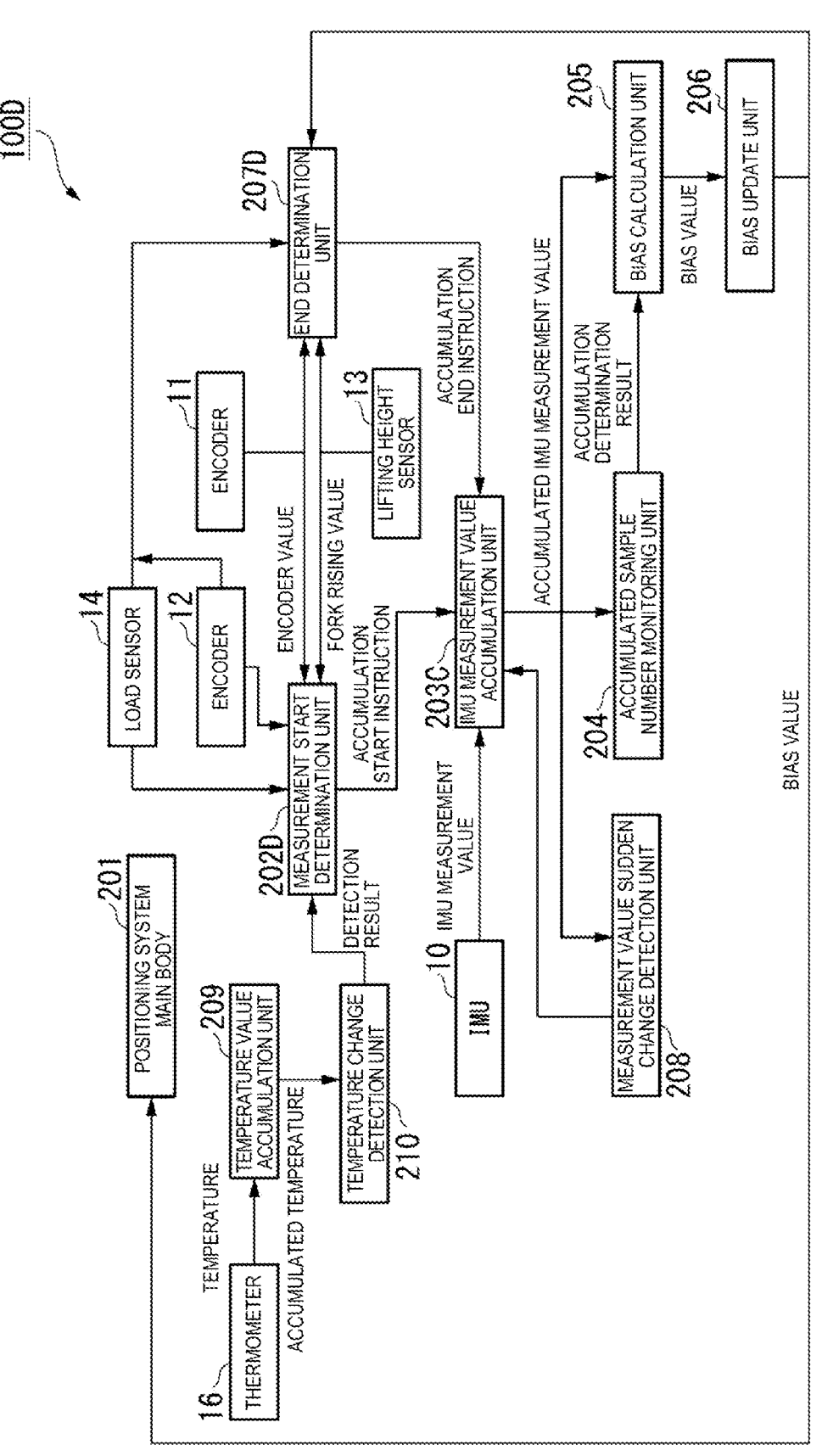
FIG. 12 is a view illustrating an example of a positioning system according to the fifth embodiment.
Figure 13:
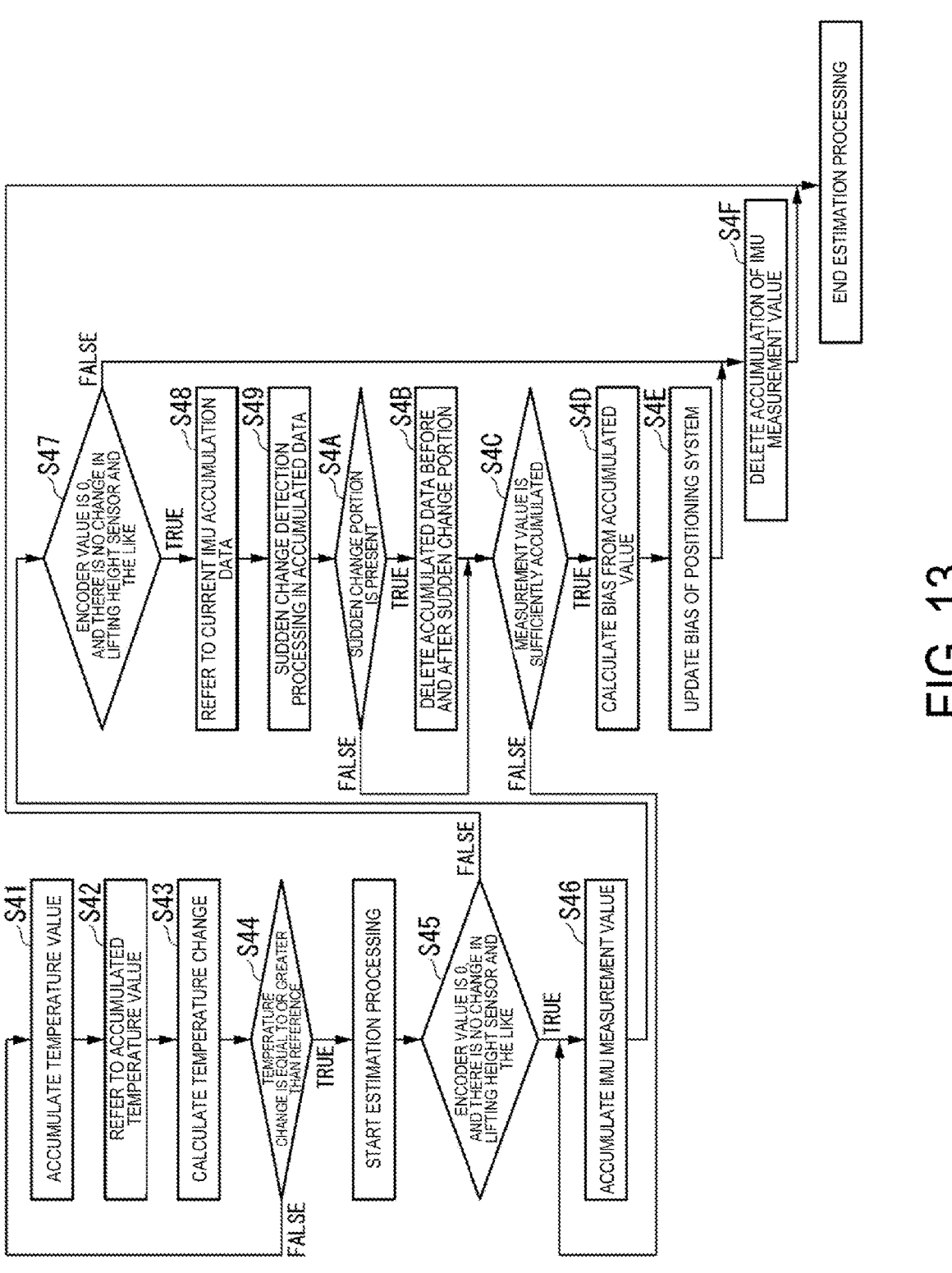
FIG. 13 is a flowchart illustrating an example of bias estimation processing according to the fifth embodiment.

FIG. 12 is a view illustrating an example of a positioning system according to the fifth embodiment. Although the fifth embodiment can be combined with any of the configurations of the first to fourth embodiments, FIG. 12 illustrates a configuration example of being combined with the fourth embodiment. As illustrated in FIG. 12, the positioning system 100D includes the positioning system main body 201, a measurement start determination unit 202D, the IMU measurement value accumulation unit 203C, the accumulated sample number monitoring unit 204, the bias calculation unit 205, the bias update unit 206, the end determination unit 207B, the measurement value sudden change detection unit 208, the temperature value accumulation unit 209, the temperature change detection unit 210, the IMU 10, the first encoder 11, the second encoder 12, the lifting height sensor 13, the load sensor 14, and the temperature sensor 16. Among them, the positioning system main body 201, the measurement start determination unit 202D, the IMU measurement value accumulation unit 203C, the accumulated sample number monitoring unit 204, the bias calculation unit 205, the bias update unit 206, and the end determination unit 207D, the measurement value sudden change detection unit 208, the temperature value accumulation unit 209, and the temperature change detection unit 210 are implemented on the computation device 20D. In the configuration according to the fifth embodiment, the same reference numerals are given to the same components as those of the positioning system 100 according to the first embodiment, and the description thereof will be omitted.

The temperature value accumulation unit 209 is configured to include a storage medium such as a memory. The temperature value accumulation unit 209 acquires and stores a temperature value from the temperature sensor 16. The temperature value accumulation unit 209 deletes data in which the time elapsed from the measurement exceeds a certain time among the accumulated temperature values.

With reference to the time-series temperature value data accumulated in the temperature value accumulation unit 209, the temperature change detection unit 210 determines whether the temperature change is equal to or greater than the reference. For example, the temperature change detection unit 210 determines that a temperature change has occurred when a difference between an average of recently acquired data (for example, several temperature values back from the latest temperature value or temperature values acquired in the latest 1 to 2 seconds) and an average of data acquired before that, of data accumulated in the temperature value accumulation unit 209, is equal to or greater than a predetermined standard.

Upon confirming that the temperature change is detected by the temperature change detection unit 210, that bias update is not performed after the detection, that the measurement value of the first encoder 11 and/or the second encoder 12 is 0, and that the change amount of the measurement values of the lifting height sensor 13 and the load sensor 14 is 0, the measurement start determination unit 202D determines to start accumulation of the IMU measurement value.

The end determination unit 207D is similar to the end determination unit 207B of the third embodiment.

Operation

Next, bias estimation processing by the positioning system 100D will be described with reference to FIG. 13. FIG. 13 is a flowchart illustrating an example of bias estimation processing according to the fifth embodiment.

The temperature value accumulation unit 209 acquires the temperature value from the temperature sensor 16, and accumulates the temperature value (step S41). Next, the temperature change detection unit 210 refers to the accumulated temperature value (step S42). The temperature change detection unit 210 calculates a temperature change (step S43). Next, the temperature change detection unit 210 determines whether the temperature change is equal to or greater than the reference (step S44). If the temperature change is less than the reference (step S44; False), the bias estimation processing ends. If the calculated temperature change is equal to or greater than the reference (step S44; True), the temperature change detection unit 210 notifies the measurement start determination unit 202D that the temperature change has been detected. This starts the bias estimation processing. Subsequent processing is similar to that of the fourth embodiment, and therefore will be briefly described. Upon acquiring the notification of temperature change detection from the temperature change detection unit 210, the measurement start determination unit 202D determines whether the measurement value from the first encoder 11 and/or the second encoder 12 is 0 and there is no change in the measurement value of the lifting height sensor 13 and the measurement value of the load sensor 14 (step S45). If the measurement value of the first encoder 11 and/or the second encoder 12 is not 0, or the measurement value of the lifting height sensor 13 or the measurement value of the load sensor 14 changes (step S45; False), the bias estimation processing ends.

If the measurement value of each sensor satisfies the above condition (step S45; True), the measurement start determination unit 202D determines to start accumulation of the IMU measurement value, and instructs the IMU measurement value accumulation unit 203C to start accumulation of the IMU measurement value. The IMU measurement value accumulation unit 203C acquires the measurement value from the IMU 10 and accumulates the acquired IMU measurement value (step S46). The end determination unit 207D determines whether the measurement value from the first encoder 11 and/or the second encoder 12 is 0 and there is no change in the measurement value of the lifting height sensor 13 and the measurement value of the load sensor 14 (step S47). If this condition is not satisfied (step S47; False), the end determination unit 207D deletes the IMU measurement value accumulated in the IMU measurement value accumulation unit 203C (step S4F), and ends the bias estimation processing.

If the measurement value of each sensor satisfies the above condition (step S47; True), the measurement value sudden change detection unit 208 refers to the IMU measurement value accumulated in the IMU measurement value accumulation unit 203C (step S48). The measurement value sudden change detection unit 208 executes sudden change detection processing (step S49). The measurement value sudden change detection unit 208 determines whether the sudden change portion can be detected (step S4A). If the sudden change portion has not been detected (step S4A; False), the process proceeds to step S4C. If the sudden change portion can be detected (step S4A; True), the IMU measurement value accumulation unit 203C deletes data of the sudden change portion and data before and after the sudden change portion from the time-series data of the IMU measurement value accumulated (step S4B).

Next, the accumulated sample number monitoring unit 204 determines whether the IMU measurement value accumulation unit 203C has accumulated a sufficient number of IMU measurement values (step S4C). If the IMU measurement values have not been sufficiently accumulated (step S4C; False) the processing in and after step S46 is repeatedly executed. If the IMU measurement values are sufficiently accumulated (step S4C; True), the bias calculation unit 205 calculates the bias (step S4D). Next, the bias update unit 206 updates the bias of the positioning system 100D (step S4E). Next, the end determination unit 207D deletes the IMU measurement value accumulated in the IMU measurement value accumulation unit 203C (step S4F), and ends the bias estimation processing. The series of processing in steps S41 to S4F may be repeatedly executed while the forklift 1D is in operation.

Effects

As described above, according to the present embodiment, by 40 performing bias estimation and update only at the time of the temperature change, which is the main factor of the bias change, it is possible to secure the positioning accuracy while lowering the calculation load.

Figure 14:
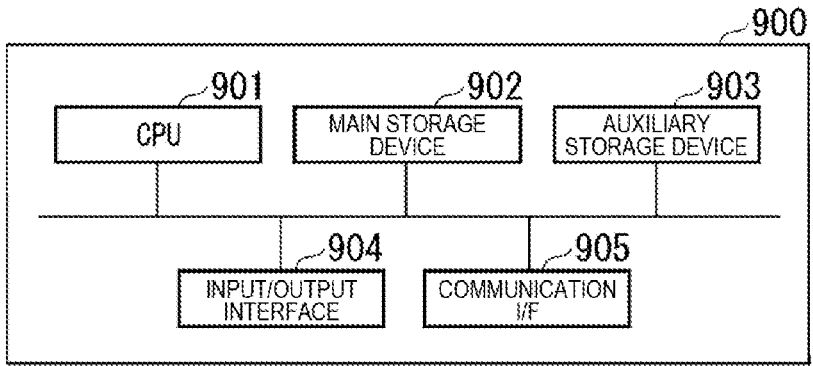
FIG. 14 is a view illustrating an example of a hardware configuration of the positioning system according to each embodiment.

FIG. 14 is a view illustrating an example of the hardware configuration of the positioning system according to each embodiment.

A computer 900 includes a CPU 901, a main storage device 902, an auxiliary storage device 903, an input/output interface 904, and a communication interface 905.

The computation devices 20 to 20D described above are each implemented on the computer 900. The functions described above are stored in the auxiliary storage device 903 in a format of a program. The CPU 901 reads the program from the auxiliary storage device 903, develops the program to the main storage device 902, and executes the above-mentioned processing in accordance with the program. The CPU 901 secures a storage area in the main storage device 902 in compliance with the program. The CPU 901 secures a storage area for storing data under processing in the auxiliary storage device 903 in compliance with the program.

Note that a program for implementing all or some of the functions of the computation devices 20 to 20D may be recorded in a computer-readable recording medium, and the program recorded in this recording medium may be read and executed by a computer system to perform processing by each functional unit. The "computer system" here includes hardware such as an operating system (OS) or peripheral equipment. In addition, if a world wide web (WWW) system is used, the "computer system" also includes a home page providing environment (or a display environment). The "computer readable recording medium" refers to a portable medium such as a CD, a DVD, or a USB, or a storage device such as a hard disk built in a computer system. Further, when this program is distributed to the computer 900 through a communication line, the computer 900 receiving the distribution may develop the program to the main storage device 902, and may execute the above-mentioned processing. The above-described program may implement part of the functions described above, and furthermore, also implement the functions described above in combination with a program already recorded in the computer system.

In the foregoing, certain embodiments of the disclosure have been described, but all of these embodiments are merely illustrative and are not intended to limit the scope of the disclosure. These embodiments may be implemented in various other forms, and various omissions, substitutions, and alterations may be made without departing from the gist of the disclosure. These embodiments and modifications are included in the scope and gist of the disclosure and are also included in the scope of the disclosure described in the claims and equivalents thereof.

Notes

The bias estimation device, the forklift, the bias estimation method, and the program described in each embodiment are grasped as follows, for example.

(1) The bias estimation device (any one of the computation devices 20 to 20D) according to a first aspect includes a determination unit (a respective one of the measurement start determination units 202 to 202D and a respective one of the end determination units 207 to 207D) configured to determine whether a forklift is stationary based on a measurement value from a first sensor (the first encoder 11 or the second encoder 12) configured to detect information regarding movement of a respective one of the forklifts 1 to 1D and a measurement value from a second sensor (the lifting height sensor 13 or the load sensor 14) configured to detect information regarding a cargo handling device of the forklift, an accumulation unit (the IMU measurement value accumulation unit 203 or 203C) configured to accumulate an IMU measurement value that is a measurement value from an inertial measurement unit (the IMU included in the forklift when the determination unit determines that the forklift is stationary and stop accumulation of the IMU measurement value when the determination unit determines that the forklift is not stationary, and a calculation unit (the bias calculation unit 205) configured to calculate a bias of the IMU measurement value based on the IMU measurement value accumulated in the accumulation unit.

This can accurately estimate the bias.

(2) The bias estimation device according to a second aspect is the bias estimation device of (1). The determination unit determines that the forklift is stationary when a first condition that a measurement value from the first sensor does not indicate that the forklift is moving and that a measurement value from the second sensor does not indicate that the forklift is in cargo handling operation is satisfied and determines that the forklift is not stationary when the first condition is not satisfied.

This can determine with high accuracy whether the forklift is stationary (third embodiment).

(3) The bias estimation device according to a third aspect is the bias estimation device of (2). The determination unit acquires information on whether the inertial measurement unit is activated, determines that the forklift is stationary when the inertial measurement unit is activated and the first condition is satisfied, and determines that the forklift is not stationary otherwise.

This can determine with high accuracy whether the forklift is stationary (first embodiment).

(4) The bias estimation device according to a fourth aspect is the bias estimation device of (1) to (3). The determination unit acquires information on whether the forklift is being charged, determines that the forklift is stationary when the forklift is being charged, and determines that the forklift is not stationary when the forklift is not being charged.

This can determine whether the forklift is stationary (second embodiment).

(5) The bias estimation device according to a fifth aspect is the bias estimation device of (1) to (4) further includes a sudden change portion detection unit configured to detect a sudden change portion of the IMU measurement value accumulated in the accumulation unit. The accumulation unit deletes, from the IMU measurement value accumulated, the IMU measurement value of the sudden change portion detected by the sudden change portion detection unit, and the calculation unit calculates the bias based on the IMU measurement value after deletion.

This can perform bias estimation excluding data unsuitable for bias estimation mixed in the IMU measurement values accumulated in the accumulation unit.

(6) The bias estimation device according to a sixth aspect is the bias estimation device of (1) to (5) further includes a temperature value accumulation unit configured to accumulate time-series temperature data regarding an ambient temperature of the forklift and a temperature change detection unit configured to detect whether the ambient temperature has changed by equal to or greater than a reference based on the time-series temperature data accumulated in the temperature value accumulation unit. The accumulation unit accumulates the IMU measurement value when the temperature change detection unit determines that the ambient temperature has changed by equal to or greater than the reference and the determination unit determines that the forklift is stationary.

Estimating the bias susceptible to the temperature change only when there is a temperature change can have the accuracy of the bias while reducing the calculation load.

(7) The bias estimation device according to a seventh aspect is the bias estimation device of (1) to (6). The first sensor is a sensor that detects a rotation speed and/or a steering angle of a tire included in the forklift, and the second sensor is a sensor that detects a lifting height position of a fork included in the forklift and/or a weight of a cargo loaded on the fork.

This can detect whether the forklift is moving or rotating or whether the forklift is in cargo handling operation using the forklift and determine whether the forklift is stationary from both viewpoints.

(8) The bias estimation device (the computation device 20B) according to an eighth aspect includes a determination unit (the measurement start determination unit 202A or the end determination unit 207A) configured to acquire information on whether a forklift is being charged, determine that the forklift is stationary when the forklift is being charged, and determine that the forklift is not stationary when the forklift is not being charged, an accumulation unit (the IMU measurement value accumulation units 203 or 203C) configured to accumulate an IMU measurement value that is a measurement value from an inertial measurement unit (the IMU 10) included in the forklift when the determination unit determines that the forklift is stationary and stop accumulation of the IMU measurement value when the determination unit determines that the forklift is not stationary, and a calculation unit (the bias calculation unit 205) configured to calculate a bias of the IMU measurement value based on the IMU measurement value accumulated in the accumulation unit.

Performing bias estimation using the fact that the forklift being charged is stationary can estimate the bias with high accuracy (second embodiment).

(9) The forklift according to a ninth aspect includes the bias estimation device of (1) to (7), a positioning device (the positioning system main body 201) configured to compensate the IMU measurement value by using the bias estimation device and determine a position of the forklift, a traveling body, and a cargo handling device.

(10) The bias estimation method according to a tenth aspect includes a step of repeatedly determining whether a forklift is stationary based on a measurement value from a first sensor configured to detect information regarding movement of the forklift and a measurement value from a second sensor configured to detect information regarding a cargo handling device included in the forklift, a step of accumulating an IMU measurement value that is a measurement value from an inertial measurement unit included in the forklift when the forklift is determined to be stationary in the step of determining, a step of stopping accumulation of the IMU measurement value when the forklift is determined to be not stationary in the step of determining, and a step of calculating a bias of the IMU measurement value based on the IMU measurement value accumulated.

(11) The program according to an eleventh aspect causes the computer 900 to execute a step of repeatedly determining whether a forklift is stationary based on a measurement value from a first sensor configured to detect information regarding movement of the forklift and a measurement value from a second sensor configured to detect information regarding a cargo handling device included in the forklift, a step of accumulating an IMU measurement value that is a measurement value from an inertial measurement unit included in the forklift when the forklift is determined to be stationary in the step of determining, a step of stopping accumulation of the IMU measurement value when the forklift is determined to be not stationary in the step of determining, and a step of calculating a bias of the IMU measurement value based on the IMU measurement value accumulated.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A bias estimation device, comprising:
a determination unit configured to determine whether a forklift is stationary based on a measurement value from a first sensor configured to detect information regarding movement of the forklift and a measurement value from a second sensor configured to detect information regarding a cargo handling device included in the forklift;
an accumulation unit configured to accumulate an IMU measurement value that is a measurement value from an inertial measurement unit included in the forklift when the determination unit determines that the forklift is stationary and stop accumulation of the IMU measurement value when the determination unit determines that the forklift is not stationary;
an accumulated sample number monitoring unit configured to determine that a sufficient number of samples for estimating the bias of the IMU measurement values have been obtained when the number of accumulated IMU measurement values becomes equal to or greater than a threshold;
a calculation unit configured to calculate a bias of the IMU measurement value based on the IMU measurement value accumulated in the accumulation unit in response to being determined that a sufficient number of samples for estimating the bias of the IMU measurement values have been obtained; and
an end determination unit configured to delete the IMU measurement values accumulated so far when the calculation unit ends the calculation of the bias or the determination unit determines the forklift is not stationary,
wherein the calculation unit outputs the bias of the IMU measurement value which is calculated.

2. The bias estimation device according to claim 1, wherein the determination unit determines that the forklift is stationary when a first condition that a measurement value from the first sensor does not indicate that the forklift is moving and that a measurement value from the second sensor does not indicate that the forklift is in cargo handling operation is satisfied and determines that the forklift is not stationary when the first condition is not satisfied.

3. A bias estimation device, comprising:
a determination unit configured to determine whether a forklift is stationary based on a measurement value from a first sensor configured to detect information regarding movement of the forklift and a measurement value from a second sensor configured to detect information regarding a cargo handling device included in the forklift;

an accumulation unit configured to accumulate an IMU measurement value that is a measurement value from an inertial measurement unit included in the forklift when the determination unit determines that the forklift is stationary and stop accumulation of the IMU measurement value when the determination unit determines that the forklift is not stationary; and
a calculation unit configured to calculate a bias of the IMU measurement value based on the IMU measurement value accumulated in the accumulation unit,
wherein the determination unit determines that the forklift is stationary when a first condition that a measurement value from the first sensor does not indicate that the forklift is moving and that a measurement value from the second sensor does not indicate that the forklift is in cargo handling operation is satisfied and determines that the forklift is not stationary when the first condition is not satisfied,
wherein the determination unit acquires information on whether the inertial measurement unit is activated, determines that the forklift is stationary when the inertial measurement unit is activated and the first condition is satisfied, and determines that the forklift is not stationary otherwise,
wherein the calculation unit outputs the bias of the IMU measurement value which is calculated.

4. The bias estimation device according to claim 1, wherein the determination unit acquires information on whether the forklift is being charged, determines that the forklift is stationary when the forklift is being charged, and determines that the forklift is not stationary when the forklift is not being charged.

5. The bias estimation device according to claim 1, further comprising
a sudden change portion detection unit configured to detect a sudden change portion of the IMU measurement value accumulated in the accumulation unit, wherein
the accumulation unit deletes the IMU measurement value of the sudden change portion detected by the sudden change portion detection unit and the IMU measurement values of before and after the detected sudden change portion,
the calculation unit calculates the bias based on the IMU measurement value remaining after deletion, and
the sudden change portion detection unit specifies, as a sudden change portion, a section including data having a deviation of equal to or greater than a certain width from an average of the IMU measurement values in a temporally continuous section in the accumulated data.

6. The bias estimation device according to claim 1, further comprising:
a temperature value accumulation unit configured to accumulate time-series temperature data regarding an ambient temperature of the forklift; and
a temperature change detection unit configured to detect whether the ambient temperature has changed by equal to or greater than a reference based on the time-series temperature data accumulated in the temperature value accumulation unit, wherein
the accumulation unit accumulates the IMU measurement value when the temperature change detection unit determines that the ambient temperature has changed by equal to or greater than the reference and the determination unit determines that the forklift is stationary.

7. The bias estimation device according to claim 1, wherein the first sensor is a sensor that detects a rotation speed and/or a change of steering angle of a tire included in the forklift, and the second sensor is a sensor that detects a change of lifting height position of a fork included in the forklift and/or a change of weight of a cargo loaded on the fork.

8. A forklift, comprising:

a traveling body;

a cargo handling device;

the bias estimation device according to claim 1; and a positioning device configured to compensate the IMU measurement value by using the bias estimation device and determine a position of the forklift based on the IMU measurement value after compensation.

9. The bias estimation device according to claim 1, further comprising a sudden change portion detection unit configured to apply a random sample consensus (RANSAC) algorithm to the accumulated IMU measurement value data accumulated in the accumulation unit to determine an outlier and a normal value, wherein the accumulation unit deletes the IMU measurement value determined to be an outlier and the IMU measurement values before and after the determined IMU measurement value, and the calculation unit calculates the bias based on the IMU measurement value remaining after deletion.

10. The bias estimation device according to claim 9, wherein the sudden change portion detection unit learns the IMU measurement value not including the sudden change portion and the IMU measurement value deleted, and construct a model distinguishes them, and determines whether or not each of the IMU measurement values accumulated in the IMU measurement value accumulation unit belongs to the sudden change portion based on the learned model, and the accumulation unit deletes the IMU measurement value determined to belong to the IMU measurement value deleted and the IMU measurement values before and after the determined IMU measurement value.

11. A bias estimation device, comprising:

a determination unit configured to acquire information on whether a forklift is being charged, determine that the forklift is stationary when the forklift is being charged, and determine that the forklift is not stationary when the forklift is not being charged;

an accumulation unit configured to accumulate an IMU measurement value that is a measurement value from an inertial measurement unit included in the forklift when the determination unit determines that the forklift is stationary and stop accumulation of the IMU measurement value when the determination unit determines that the forklift is not stationary;

an accumulated sample number monitoring unit configured to determine that a sufficient number of samples for estimating the bias of the IMU measurement values have been obtained when the number of accumulated IMU measurement values becomes equal to or greater than a threshold;

a calculation unit configured to calculate a bias of the IMU measurement value based on the IMU measurement value accumulated in the accumulation unit in response to being determined that a sufficient number of samples for estimating the bias of the IMU measurement values have been obtained; and an end determination unit configured to delete the IMU measurement values accumulated so far when the calculation unit ends the calculation of the bias or the determination unit determines the forklift is not stationary, wherein the calculation unit outputs the bias of the IMU measurement value which is calculated.

12. A bias estimation method, comprising:

a step of repeatedly determining whether a forklift is stationary based on a measurement value from a first sensor configured to detect information regarding movement of the forklift and a measurement value from a second sensor configured to detect information regarding a cargo handling device included in the forklift;

a step of accumulating an IMU measurement value that is a measurement value from an inertial measurement unit included in the forklift when the forklift is determined to be stationary in the step of determining;

a step of stopping accumulation of the IMU measurement value and deleting the IMU measurement value when the forklift is determined to be not stationary in the step of determining;

a step of determining that a sufficient number of samples for estimating the bias of the IMU measurement values have been obtained when the number of accumulated IMU measurement values becomes equal to or greater than a threshold;

a step of calculating a bias of the IMU measurement value based on the IMU measurement value accumulated in response to being determined, in the step of determining, that a sufficient number of samples for estimating the bias of the IMU measurement values have been obtained; and a step of deleting the IMU measurement values accumulated when the calculation of the bias is ended, wherein, in the step of calculating, outputting the bias of the IMU measurement value which is calculated.

13. A non-transitory computer readable storage medium storing a program that causes a computer to execute:

a step of repeatedly determining whether a forklift is stationary based on a measurement value from a first sensor configured to detect information regarding movement of the forklift and a measurement value from a second sensor configured to detect information regarding a cargo handling device included in the forklift;

a step of accumulating an IMU measurement value that is a measurement value from an inertial measurement unit included in the forklift when the forklift is determined to be stationary in the step of determining;

a step of stopping accumulation of the IMU measurement value and deleting the IMU measurement value when the forklift is determined to be not stationary in the step of determining;

a step of determining that a sufficient number of samples for estimating the bias of the IMU measurement values have been obtained when the number of accumulated IMU measurement values becomes equal to or greater than a threshold;

a step of calculating a bias of the IMU measurement value based on the IMU measurement value accumulated in response to being determined, in the step of determining, that a sufficient number of samples for estimating the bias of the IMU measurement values have been obtained; and a step of deleting the IMU measurement values accumulated when the calculation of the bias is ended, wherein, in the step of calculating, outputting the bias of the IMU measurement value which is calculated.

\*    \*    \*    \*    \*